(12) United States Patent
Kumar et al.

(10) Patent No.: US 11,959,450 B2
(45) Date of Patent: Apr. 16, 2024

(54) SYSTEM AND METHOD FOR CRANKING AN ENGINE

(71) Applicant: Transportation IP Holdings, LLC, Norwalk, CT (US)

(72) Inventors: Ajith Kuttannair Kumar, Erie, PA (US); Bret Worden, Erie, PA (US); Jeffrey Louis Daigle, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 53 days.

(21) Appl. No.: 17/644,849

(22) Filed: Dec. 17, 2021

(65) Prior Publication Data
US 2022/0205420 A1 Jun. 30, 2022

Related U.S. Application Data

(60) Provisional application No. 63/133,103, filed on Dec. 31, 2020.

(51) Int. Cl.
*F02N 11/08* (2006.01)
*B60R 16/023* (2006.01)
(Continued)

(52) U.S. Cl.
CPC ...... *F02N 11/0866* (2013.01); *B60R 16/0232* (2013.01); *B60R 16/033* (2013.01);
(Continued)

(58) Field of Classification Search
CPC .............. F02N 11/0866; F02N 11/087; B60R 16/0232; B60R 16/033; H02J 7/1423; H02J 2310/48
See application file for complete search history.

(56) References Cited

U.S. PATENT DOCUMENTS 4,211,083 A * 7/1980 Ueno ............... F01L 13/06
60/629
6,023,137 A 2/2000 Kumar et al.
(Continued)

FOREIGN PATENT DOCUMENTS

| RU | 2017108541 | 9/2018 |
|---|---|---|
| RU | 2688930 | 5/2019 |
| RU | 2716792 | 3/2020 |

OTHER PUBLICATIONS

Office Action received for related Eurasian Patent Application No. 202193280 dated Sep. 12, 2022 (6 pages).
(Continued)

*Primary Examiner* — Gonzalo Laguarda
(74) *Attorney, Agent, or Firm* — The Small Patent Law Group LLC; Philip S. Hof

(57) ABSTRACT

A system and method includes a secondary energy storage system (SESS) and a control system. The SESS is configured to be disposed onboard a vehicle and conductively connected via switch devices to a primary battery and a cranking device of the vehicle. The control system is configured to control the switch devices to close a conductive path to discharge electric current from the SESS for powering the cranking device to rotate an engine shaft during a cranking operation. The control system is configured to control the switch devices to open the conductive path and prevent discharge of electric current from the SESS after the cranking operation is complete.

20 Claims, 12 Drawing Sheets

(51) Int. Cl.
 B60R 16/033 (2006.01)
 H02J 7/14 (2006.01)
(52) U.S. Cl.
 CPC .......... F02N 11/087 (2013.01); H02J 7/1423 (2013.01); H02J 2310/48 (2020.01)

(56) References Cited

U.S. PATENT DOCUMENTS

| | | | | |
|---|---|---|---|---|
| 9,627,908 | B2* | 4/2017 | Kaminsky | H01M 50/296 |
| 2005/0224035 | A1* | 10/2005 | Burke | F02N 11/0866 |
| | | | | 290/38 R |
| 2009/0322101 | A1 | 12/2009 | Reynolds | |
| 2016/0298589 | A1* | 10/2016 | Setterberg | H02J 7/1423 |
| 2020/0127487 | A1* | 4/2020 | Franzén | F02N 11/0866 |

OTHER PUBLICATIONS

Office Action received for related Eurasian Patent Application No. 202193280 dated Oct. 10, 2022 (2 pages).

* cited by examiner

SYSTEM AND METHOD FOR CRANKING AN ENGINE

CROSS-REFERENCE TO RELATED APPLICATIONS

This application relates to and claims priority benefits from U.S. Provisional Application No. 63/133,103, filed Dec. 31, 2020, which is hereby incorporated by reference in its entirety.

BACKGROUND

Technical Field

The subject matter herein describes embodiments relating to internal combustion engine start-up operations, particularly for vehicle engines.

Discussion of Art

In some vehicles, such as conventional diesel electric locomotives, an internal combustion engine is used to mechanically drive a synchronous generator that supplies electric current to a plurality of alternating current (AC) traction motors whose rotors are drivingly coupled through speed reducing gearing to respective axle wheel sets of the vehicle for propelling the vehicle on a route. The generator typically comprises a main three-phase traction alternator, the rotor of which is mechanically coupled to the output shaft of the engine. When excitation current is supplied to field windings on the rotating rotor, alternating voltages are generated in three-phase armature windings on the stator of the alternator. These voltages are rectified to produce a controlled amplitude direct current (DC) voltage and then applied to one or more pulse width modulation (PWM) inverters which control the effective frequency of alternating current to be supplied to the armature windings of the AC traction motors. The effective AC excitation frequency produced by the inverters controls the speed of the AC motors with power being controlled by pulse width modulation of the AC waveform.

At initial start-up of the vehicle from an off or shutdown state of the engine, the onboard battery (referred to herein as primary battery) can be used to provide electrical power for cranking of the engine during a cranking operation. Typically, the primary battery is connected to supply DC power to an inverter, and the inverter is operated to convert the DC power to controlled frequency AC power. The inverter that receives the DC power from the primary battery may be one of the PWM inverters that supply AC power to the traction motors or a separate inverter exclusively dedicated to the cranking operation. The inverter is switched into circuit with the synchronous generator, and the generator is operated as a motor to turn the output shaft of the engine for cranking. During the cranking operation, the rotor of the generator (e.g., the alternator), which is mechanically coupled to an output shaft (e.g., crankshaft) of the engine, rotates the output shaft to start the engine.

Initially the output torque of the rotor (and hence the magnitude of current in the stator windings) needs to be relatively high in order to start turning the crankshaft. As the rotor accelerates from rest, less torque (and current) will be required, while the fundamental frequency of load current increases with engine speed (revolutions per minute). During the cranking operation, the inverter supplies the machine with current of properly varying magnitude and frequency until the engine is self-sustainable, meaning that the crankshaft is rotating at a rate that equals or exceeds a minimum speed at which normal running conditions of the engine can be sustained.

Vehicles typically utilize the primary battery to supply electrical energy to the motor for powering the cranking operation. However, if the primary battery is partially or fully depleted, the electrical energy supplied by the primary battery may be insufficient to successfully crank the engine. For example, the primary battery is typically used to power several non-propulsive or auxiliary loads, such as lights, electronic devices (e.g., radios, computers, sensors, display devices, speakers, etc.), environmental control systems or heating, ventilation, and air conditioning (HVAC) systems, and/or the like. If, for example, the primary battery powers one or more auxiliary loads for an extended period of time after the vehicle completes a trip and the engine shuts down, then the primary battery may have a significantly reduced state of charge when the engine is required to be started again. The depleted primary battery may not be able to discharge (e.g., supply) sufficient current to provide adequate torque for rotating the engine shaft. Furthermore, the voltage in the primary battery may drop to a level that prevents the primary battery from sustaining the other loads, such as control electronics, which can have secondary repercussions. If the primary battery is not able to successfully crank the engine, remedial action may have to be implemented, such as jumpstarting the engine and/or charging the primary battery from an external power source, either of which could cause a delay.

Even if the primary battery is able to complete the cranking task, the crank loads can degrade the health of, and extract life from, the primary battery over time. For example, the crank loads can contribute to the primary battery experiencing deep discharge cycles in which the amount of available electrical energy stored in the primary battery frequently drops to less than 30% capacity, less than 20% capacity, or even less than 10% capacity. The deep discharge cycles can shorten the life of the primary battery. It may be desirable to have a system and method that improves reliability of the cranking operation and eases the load burden on the primary battery. It may be desirable to have a system and method that differs from those that are currently available.

BRIEF DESCRIPTION

In one or more embodiments, a cranking system is provided that includes a secondary energy storage system (SESS) and a control system. The SESS is configured to be disposed onboard a vehicle and conductively connected, via switch devices, to a primary battery and a cranking device of the vehicle. The control system is configured to control the switch devices to close a conductive path to discharge electric current from the SESS for powering the cranking device to rotate an engine shaft during a cranking operation. The control system is configured to control the switch devices to open the conductive path and prevent discharge of electric current from the SESS after the cranking operation is complete.

In one or more embodiments, a method (e.g., for cranking an engine) is provided that includes controlling, via a control system, switch devices to close a conductive path to discharge electric current from an SESS to power a cranking device of a vehicle to rotate an engine shaft during a cranking operation. The SESS is configured to be disposed onboard the vehicle and conductively connected via the switch devices to a primary battery and the cranking device. The method includes controlling the switch devices to open the conductive path and prevent discharge of electric current from the SESS after the cranking operation is complete.

In one or more embodiments, a power delivery system is provided that includes an engine, an alternator, a primary battery, an SESS, and a control system. The engine includes an engine shaft and is configured to be disposed onboard a vehicle. The alternator is mechanically coupled to the engine shaft. The primary battery is conductively connected to the alternator via at least a first switch device. The SESS is conductively connected to the alternator via at least a second switch device. The control system is configured to close the second switch device to establish a conductive path between the SESS and the alternator for supplying electric current from the SESS to power the alternator to rotate the engine shaft during a cranking operation. The control system is further configured to open the second switch device after the cranking operation to break the conductive path.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
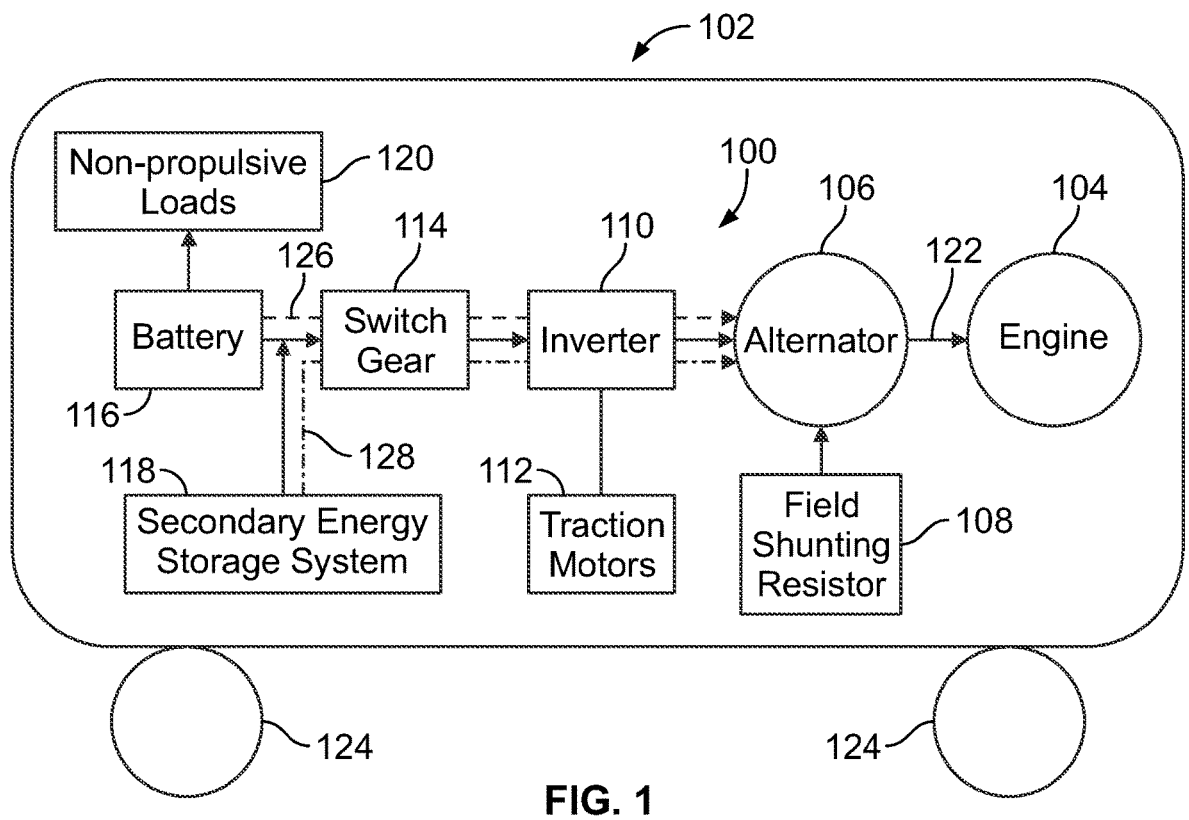
FIG. 1 illustrates a power delivery system disposed onboard a vehicle according to an embodiment.

Embodiments described herein are directed to a system and method for cranking an internal combustion engine of a vehicle. The system and method include a backup electrical energy storage system that is separate and discrete from the primary battery of the vehicle and dedicated to cranking usage. The backup electrical energy storage system is referred to herein as an SESS. The SESS may include battery cells, capacitors, or a combination of both battery cells and capacitors. The SESS may be dedicated to cranking usage because the cranking load (e.g., powering a motor that rotates the engine shaft during the cranking operation) may be one of few loads, or the only load, that is powered by the SESS. Although the SESS may be dedicated to cranking usage, the SESS may not be the only power source that is used to power all of the cranking operations. For example, as described herein, the SESS may be controlled to supplement the primary battery during a cranking operation, to alternate with the primary battery in the performance of multiple cranking operations, or to exclusively perform all cranking duties. Because the SESS is dedicated for cranking operations, which infrequently take place when the engine is restarted from shutdown, the SESS may be dormant for periods of time in a (fully) charged state. In one or more embodiments, the SESS is electrically isolated from electrical loads and electrical power sources while the SESS is dormant to avoid current drain and maintain the state of charge over time. The SESS may be electrically connected to other devices only in a few specific conditions, such as supplying electric current to power the cranking operation, supplying electric current to power a control system in the event that the primary battery is unable (e.g., due to being in a depleted state), and receiving electric current during a charging operation of the SESS. The SESS and an associated control system that controls the current in and out of the SESS can be implemented on existing vehicles that already have primary batteries.

In one or more embodiments, monitoring is used to allocate the responsibilities of the primary battery and the SESS during cranking operations and charging operations. For example, the control system associated with the SESS may monitor one or more properties or conditions of the primary battery and the SESS, and may control which source is used to power each cranking operation based at least in part on the monitored properties and programmed instructions for interpreting and responding to the monitored properties. As a result, the cranking system and method described herein is able to modify a cranking operation and/or charging operation based on monitored conditions of the primary battery and the SESS.

By providing the SESS as a backup power source and maintaining the SESS at a relatively high state of charge (e.g., at full charge or at least 80% charge), the cranking system and method disclosed herein can improve the reliability of the cranking operation and ease the load burden on the primary battery. For example, the SESS can power the cranking load in combination with the primary battery or instead of the primary battery to ensure that sufficient voltage and current is supplied to start-up the engine. Even if the primary battery is depleted due to age, health, or auxiliary loads that draw power for an extended period of time after the engine shuts down, the SESS can be controlled to step in and provide sufficient power to successfully crank the engine. As a result, the vehicle can be reliably controlled to start up and operate according to a schedule with very little risk of delay caused by a depleted primary battery.

FIG. 1 illustrates a power delivery system 100 disposed onboard a vehicle 102 according to an embodiment. The power delivery system 100 includes an internal combustion engine 104, an alternator 106, a field shunting resistor 108, one or more inverters 110, one or more traction motors 112, switch gear 114, a primary battery 116, a secondary energy storage system (SESS) 118, and one or more non-propulsive, or auxiliary, loads 120. The components of the power delivery system are electrically connected to each other via electrically conductive elements, such as power cables, wires, switch devices, and the like. In an embodiment, the engine is a diesel engine that burns diesel fuel to rotate an output shaft 122, or crankshaft. The alternator is mechanically connected to the output shaft of the engine and generates electrical energy using the mechanical energy of the output shaft. The alternator is electrically connected to the field shunting resistor. The electrical energy from the alternator is direct current (DC) power that is supplied to one or more inverters. The inverter or inverters convert the DC power to alternating current (AC) power and supply the AC power to the one or more traction motors. The traction motors are mechanically coupled via linkages to axles and wheels 124 of the vehicle. The traction motors convert the received AC power to mechanical energy that forces rotation of the axles and wheels 124 to propel the vehicle system. Other types of vehicles, such as marine vessels and aerial vehicles, may have propellers for propulsion instead of axles and wheels.

Starting the engine from a shutdown state typically requires electrically-powered rotation of the output shaft of the engine, which is referred to as a cranking operation. Typically, the primary battery is the exclusive source of electrical energy for powering the cranking of the engine. For example, the switch gear 114, which includes switch devices and associated circuitry, may be controlled to establish a closed conductive path 126 to discharge electric current from the primary battery to the one or more inverters. The electric current discharged from the primary battery may be DC power, and the one or more inverters may convert the DC power to AC power, which is then supplied to the alternator. In the illustrated embodiment, the alternator is the cranking device that converts electrical energy to mechanical energy for rotating the shaft of the engine during the cranking operation. In this case, the alternator is operating as a motor. In an alternative embodiment, the power delivery system includes a cranking device separate and discrete from the alternator for cranking the engine. When the vehicle is stationary and the engine is shut down, the primary battery may continue to supply electric current to the non-propulsive loads, which may include lights, radios, speakers, computers, display devices, instruments, sensors, HVAC components, and the like. The power draw on the primary battery by the non-propulsive loads may deplete the primary battery to a level that risks the primary battery not being able to successfully crank the engine during a subsequent start-up procedure.

The SESS is present in the power delivery system to back up the primary battery, at least with respect to cranking operations. For example, if it is determined that the primary battery is depleted beyond a threshold level, the switch gear may establish a second closed conductive path 128 to discharge electric current from the SESS to the one or more inverters and then the alternator for powering the cranking load. Optionally, the SESS may be the preferred or priority power source that is used to power cranking loads, and the primary battery may be controlled to backup or supplement the SESS when necessary based on monitored conditions.

The vehicle shown in FIG. 1 may be a standalone vehicle system or a component of a vehicle system that includes multiple vehicles. In an embodiment, the vehicle is a rail vehicle, such as a locomotive. The rail vehicle may be mechanically coupled to one or more other rail vehicles to define a train for traveling together along a route, such as railroad tracks. In another example, the vehicle can be an over-the-road vehicle that travels on a road or path. For example, the vehicle may be a truck (e.g., highway semi-truck, mining truck, logging truck, or the like). In yet other embodiments, the vehicle may be another vehicle type, such as an automobile, marine vessel, aerial vehicle, and the like. The vehicle may be controlled directly, or may simply follow the lead of another vehicle in the vehicle system.

Figure 2:
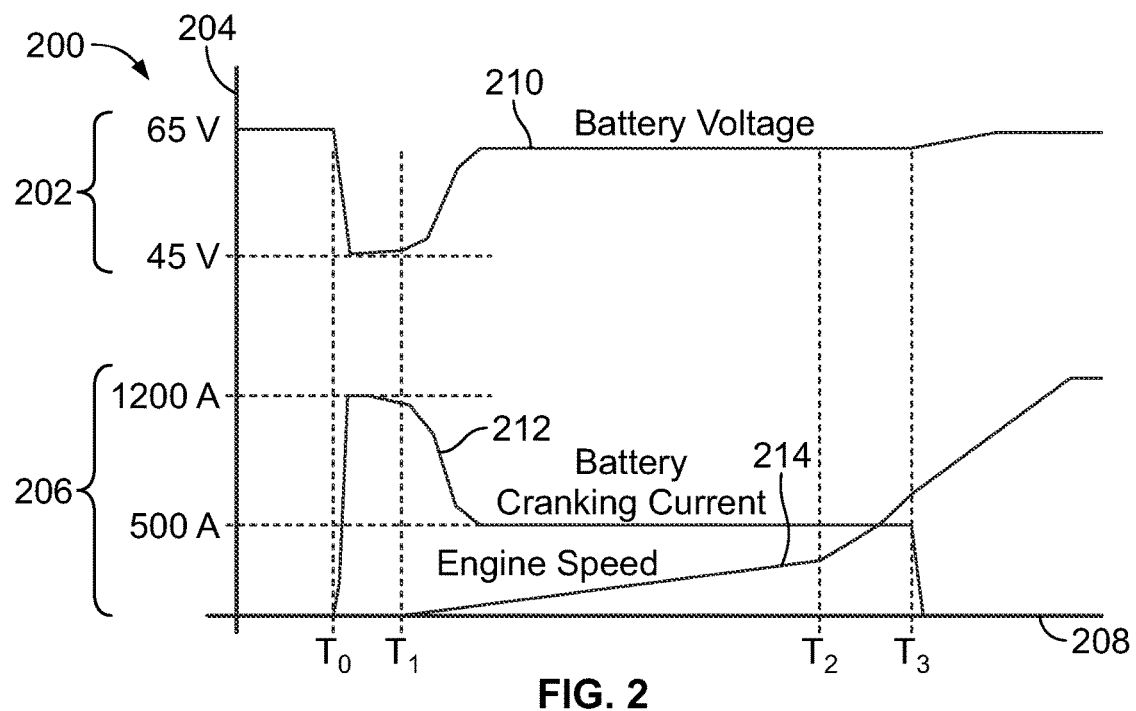
FIG. 2 is a graph depicting properties of a strong battery during a successful cranking operation.

FIG. 2 is a graph 200 depicting properties of a strong battery during a successful cranking operation. A first portion 202 of the vertical axis 204 of the graph represents battery voltage, and a second portion 206 of the vertical axis represents battery current. The horizontal axis 208 represents time. The graph includes a first plotline 210 that represents battery voltage over time, a second plotline 212 that represents battery current over time, and a third plotline 214 that represents engine speed over time. The plotlines 210, 212 refer to properties of a single battery, such as the primary battery 116 shown in FIG. 1, that is controlled to discharge electric current for powering the cranking operation.

An electrical engine starter is powered at time $T_0$, and the engine begins to accelerate at time $T_1$. Powering the engine starter caused the battery voltage to drop from 65 V to 45 V in the illustrated graph. The battery cranking current spikes from 0 amps (A) to 1200 A concurrent with the drop in voltage. It is noted that the voltage and current values are for example only, and are not intended to limit the battery. After the engine starts accelerating, the battery voltage gradually increases, and the battery cranking current gradually decreases. The peak battery current at 1200 A is sufficient to provide adequate engine torque, and the battery voltage, even at the low point of 45 V, remains sufficiently high to support the cranking control system and maintain engine acceleration. Engine combustion begins at time $T_2$, and power to the electrical starter is removed at time $T_3$. The cranking operation is successful in FIG. 2. The cranking operation extends from time $T_0$ to time $T_3$, which may be between 5 seconds and 45 seconds in duration. Optionally, the duration of the cranking operation may be between 10 seconds and 30 seconds.

Figure 3:
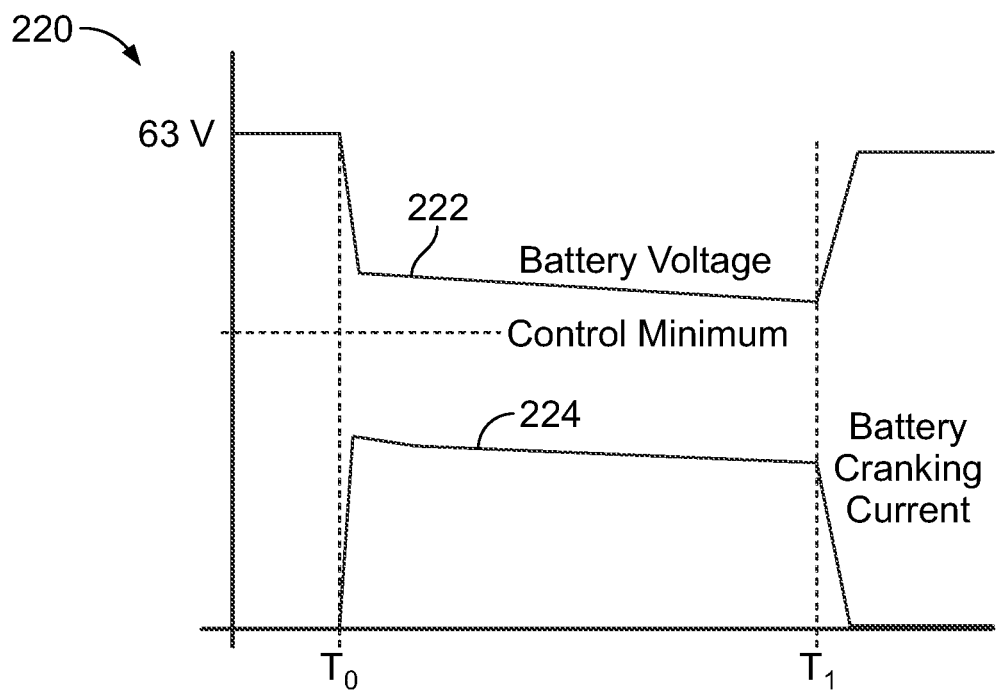
FIG. 3 is a graph depicting properties of a first depleted battery during an unsuccessful cranking operation.

FIG. 3 is a graph 220 depicting properties of a first depleted battery during an unsuccessful cranking operation. The battery may be considered depleted due to having a state of charge and/or electrical energy capacity that is below a preferred range associated with successful cranking. For example, the state of charge may be at 60%. The graph has a battery voltage plotline 222 and a battery cranking current plotline 224. The battery has a starting voltage of 63 V, which is lower than the strong battery depicted in FIG. 2. The battery begins discharging electric current at time $T_0$ to power the electrical engine starter. Due to the depleted state of the battery, the battery cranking current cannot rise to the level (e.g., 1200 A) achieved by the battery in FIG. 2. The current is inadequate to provide sufficient torque to overcome engine friction, and as a result the engine crank operation fails at time $T_1$.

Figure 4:
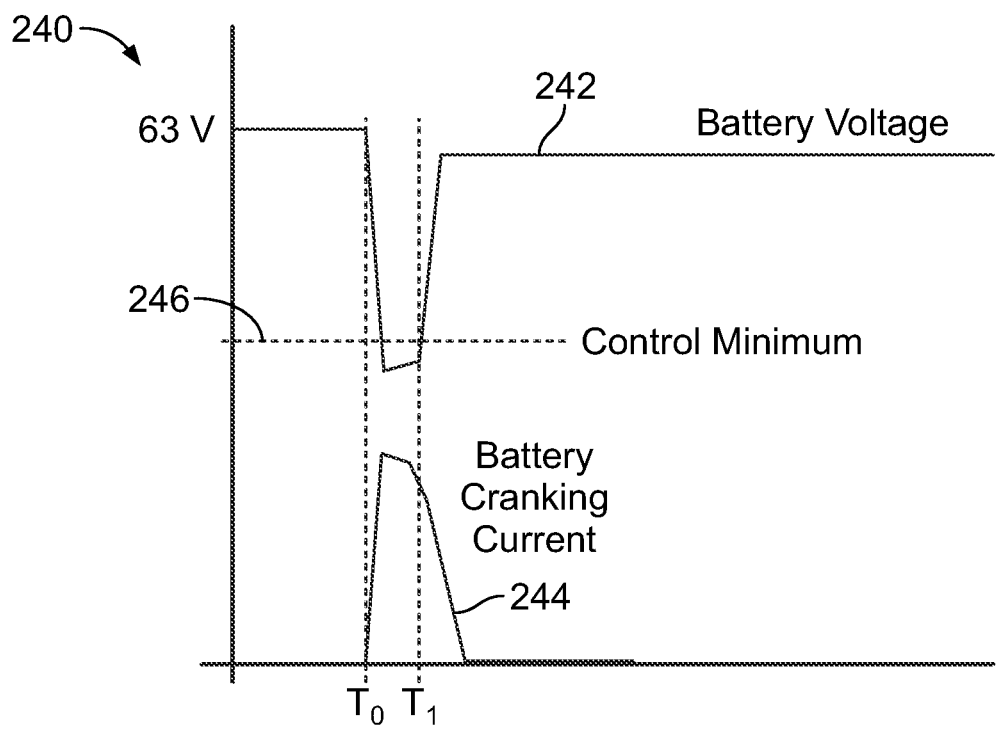
FIG. 4 is a graph depicting properties of a second depleted battery during an unsuccessful cranking operation.

FIG. 4 is a graph 240 depicting properties of a second depleted battery during an unsuccessful cranking operation. The battery in FIG. 4 may be even more depleted than the battery depicted in FIG. 3. For example, the battery in FIG. 4 may have a state of charge of about 30%. The graph has a battery voltage plotline 242 and a battery cranking current plotline 244. The battery has a starting voltage of 63 V similar to the battery in FIG. 3. The battery begins discharging electric current at time $T_0$ to power the electrical engine starter. Due to the depleted state of the battery, the voltage drops more than the batteries in FIGS. 2 and 3 to a level that is below a threshold control minimum voltage level 246. The excessive voltage drop causes a crank abort at time $T_1$.

The cranking system according to one or more embodiments described herein can detect when the primary battery is at a depleted state, such as the depleted states shown in FIGS. 3 and 4, and utilize the SESS to supplement or replace the primary battery for cranking duties to ensure successful cranking. Stated differently, the cranking system may selectively utilize the SESS to provide assured cranking.

Figure 5:
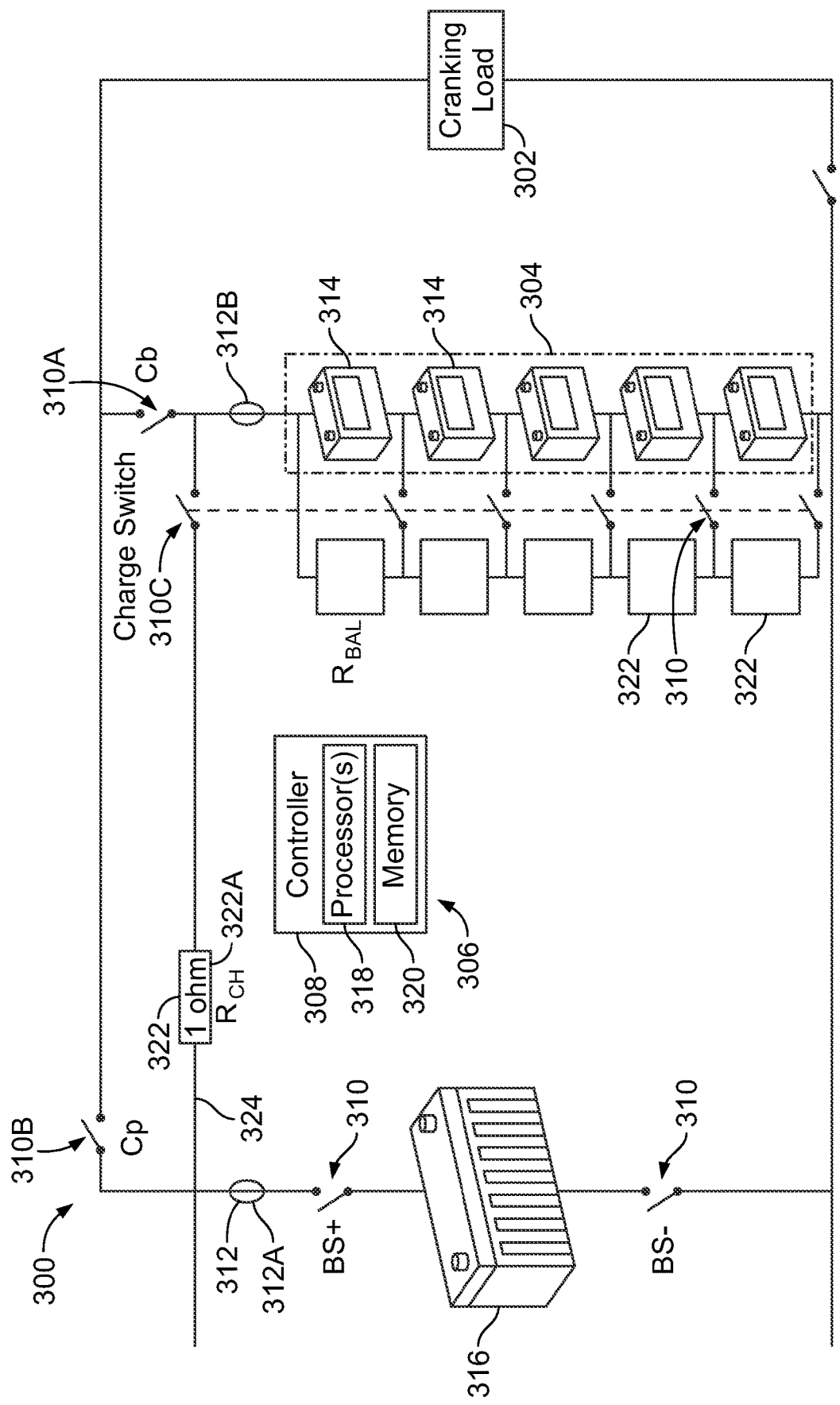
FIG. 5 is a circuit diagram showing a cranking system according to an embodiment.

FIG. 5 is a circuit diagram showing a cranking system 300 according to an embodiment. The cranking system 300 is configured to power a cranking load 302, which represents a cranking device that rotates an engine shaft of an internal combustion engine to start-up the engine. The cranking device may be a device that is discrete from the engine and mechanically connected to the engine shaft, such as a crankshaft or driveshaft. The cranking device receives power in the form of electrical energy or pneumatic energy, and converts the power that is received into mechanical energy for forcing the engine shaft to rotate, particularly when the engine is inactive. For example, the cranking load may represent the alternator 106 shown in FIG. 1 to crank the engine 104. The cranking system 300 may be disposed onboard a vehicle or vehicle system.

The cranking system 300 includes a secondary energy storage system (SESS) 304, switch devices 310, one or more sensors 312, and a control system 306. The cranking system also includes a primary battery 316 of the vehicle and the cranking load, which may be a cranking device such as an alternator, a motor, an air start motor, or the like. The primary battery may represent the primary battery of FIG. 1. The control system controls the charging and discharging of the SESS and the primary battery. The control system includes a controller 308 that has one or more processors 318 and a non-volatile computer-readable storage medium, referred to herein as memory device 320.

The SESS is electrically connected to the primary battery via electrically conductive elements 316 that define conductive paths. The electrically conductive elements 316 may include wires, traces in circuit boards, and/or the like. In the illustrated embodiment, the SESS and the primary battery are connected in parallel. Both the SESS and the primary battery are selectively electrically connected to the cranking load via different corresponding switch devices. The controller selectively operates the switch devices. For example, the controller may actuate a first switch device ("Cb") 310A in FIG. 5 to close (e.g., establish) a conductive path from the SESS to the cranking load. The first switch device is also referred to herein as a SESS discharge switch. Once the conductive path is established, electric current may be discharged from the SESS for powering the cranking load. For example, electric current may discharge from the SESS immediately upon closing the conductive path to establish a closed circuit. The controller may open the SESS discharge switch Cb to open (e.g., break) the conductive path and prevent the discharge of the electric current from the SESS. For example, once it is determined that a cranking operation is complete (e.g., successful), the controller may open the SESS discharge switch Cb to break the circuit and electrically isolate the SESS from the cranking load. Similarly, the controller may actuate a second switch device ("Cp") 310B in FIG. 5 to close a second conductive path from the primary battery to the cranking load to discharge electric current from the primary battery for powering the cranking load. The second switch device is also referred to herein as a primary discharge switch.

The SESS may include one or more battery cells, one or more capacitors, or a combination of one or more battery cells and one or more capacitors. In an embodiment, the SESS includes multiple battery modules 314 that are electrically connected to one another in series. Each battery module 314 may include one or more respective battery cells. Connecting multiple battery modules in series can increase the voltage of the SESS without requiring a large, bulky battery. The SESS in the illustrated embodiment has five battery modules, but the SESS can have more or less than five battery modules in other embodiments. For example, each of the battery modules of the SESS may be smaller in size (e.g., less volume) than the primary battery. Even in aggregate, the SESS may have a smaller size than the primary battery, which may weigh at least a thousand pounds. The presence of capacitors in the SESS may further reduce the size of the SESS relative to the SESS having only battery cells because the capacitors may be smaller than the battery cells per energy storage capacity. The battery cells in the SESS individually may have less electric current (or charge) capacity than the primary battery. For example, even in aggregate, the primary battery may have a greater electric current capacity than the SESS. Due to the reduced capacity, the SESS may be able to achieve a designated state of charge during charging quicker than the primary battery. The SESS may have a lower voltage than the primary battery. The lower voltage of the SESS may be beneficial during charging.

The one or more sensors of the cranking system is configured to monitor one or more properties or characteristics of the primary battery, the SESS, or both the primary battery and the SESS. In the illustrated embodiment, a first sensor 312A is positioned on or proximate to the primary battery to monitor properties of the primary battery, and a second sensor 312B is positioned on or proximate to the SESS to monitor properties of the SESS. The sensors may include current sensors, voltage sensors, temperature sensors, and/or the like. Although two sensors are shown in FIG. 5 including one sensor that monitors the primary battery and one sensor that monitors the SESS, the cranking system optionally may include a different arrangement of sensors. For example, at least two different sensors, such as a voltage sensor, a current sensor, and/or a temperature sensor, may monitor the primary battery, and at least two other sensors may monitor the SESS. In other embodiments, the sensors may only monitor the primary battery or may only monitor the SESS instead of monitoring one or more properties of both. The controller may be communicatively connected to the one or more sensors via wired or wireless communication pathways. For example, the controller may receive sensor signals generated by the sensors and determine properties of the primary battery and/or the SESS based on analysis of the sensor signals.

The controller may be communicatively connected to the switch devices, including the SESS and primary discharge switches, via wired or wireless communication pathways. For example, the controller may generate control signals that are communicated to specific switch devices to control a state of the specific switch devices. The switch devices may be electromechanical relays or contactors that are configured to withstand relatively high electric current and voltage along the circuit. The relays may have solenoids that convert electrical energy of control signals received from the controller to mechanical energy that moves contacts within the relays into engagement to establish conduction and out of engagement to block conduction. In another embodiment, the switch devices may be solid state switches (e.g., solid state relays). Unlike electromechanical relays which use coils, magnetic fields, springs and mechanical contacts, solid state switches utilize electrical and optical properties of solid-state semiconductors and have no moving parts. The solid-state switches may also avoid the risk of arcing while switching between the open and closed states. Based on the relatively high energy densities (or loads) conducted through the circuit, the cranking system may also include a solid-state ground fault scheme. In still another embodiment, the switch devices may be optical switches. Optical switches inherently provide electrical isolation. For example, each switch device may include an insulated-gate bipolar transistor (IGBT), MOSFET, or other transistor that has optical interfaces (e.g., an LED-to-photoreceptor isolated input, or other optical isolator control input interface) to preclude electrical noise and interference risk. The switch devices in FIG. 5 include switch devices Cp, Cb, BS+, BS−, and charge relays associated with each of the battery cells of the SESS.

The controller represents hardware circuitry that may include and/or may be connected with one or more processors 318 (e.g., one or more microprocessors, integrated circuits, microcontrollers, field programmable gate arrays, etc.). The controller may include and/or may be connected with a tangible and non-transitory computer-readable storage medium (e.g., memory) 320. For example, the memory may store programmed instructions (e.g., software) that may be executed by the one or more processors to perform the operations of the controller described herein, such as operations for allocating responsibility between the primary battery and the SESS for powering the cranking load and operations for charging the SESS. The memory additionally or alternatively may store different information, such as a log or record of sensor data generated by the one or more sensors, a log or record of cranking operations, and/or the like.

The circuit of the cranking system optionally includes additional circuit devices. For example, the circuit may include one or more resistors 322. In the illustrated embodiment, one resistor 322A is a charge resistor that is disposed along a charge circuit (or pathway) 324 that extends from the primary battery to the SESS. When the primary battery is utilized to charge the SESS by discharging current along the charge circuit, the charge resistor 322A may passively limit the electric current that is supplied to the SESS to avoid damage to the SESS or associated circuitry and devices. The charge resistor may have a relatively low resistance, such as 1 ohm. The circuit may also include various balancing resistors 322B that are associated with the different battery cells of the SESS. The balancing resistors may have greater resistances than the charge resistor. In a non-limiting example, each balancing resistor has a resistance of 100 ohms. The balancing resistors can be used to relatively evenly distribute the series voltage among the multiple batteries during the charging operation.

In one or more embodiments, the SESS is dedicated to cranking operations, such that the controller does not utilize the SESS to power non-cranking loads during ordinary circumstances. For example, the SESS may be charged to a designated charge state, such as a state of charge between 80% and 100%, and then the controller electrically isolates the SESS. The designated charge state optionally may be at least 90%. The controller may electrically isolate the SESS by opening a third switch device 310C and the SESS discharge switch Cb. The third switch device is referred to herein as a charge switch. Opening the charge switch may break or open the conductive path, also referred to herein as a charge circuit, between the primary battery and the SESS, and opening the SESS discharge switch Cb may open the conductive path between the SESS and the cranking load. The SESS is in this electrically isolated state when, due to switch positions, there are no closed conductive paths connected to the SESS. When the SESS is electrically isolated, the state of charge may remain relatively unchanged, except for minimal leakage over time. For example, the SESS may not have any float voltage applied. The SESS may be controlled to remain dormant at a charged state until the controller utilizes the SESS to power one or more loads.

In ordinary operating circumstances, the controller may maintain the SESS in the electrically isolated state except during a cranking operation, during a control assist mode in which the primary battery is depleted and unable to power the control system, and/or during a charging operation in which the SESS receives and stores electric current. During the cranking operation, the controller may activate the SESS from the dormant state by closing the SESS discharge switch Cb which establishes the closed conductive path from the SESS to the cranking load. During the charging operation, the controller may close the charge switch 310C to close a conductive path along the charge circuit (e.g., close the charge circuit) from the primary battery to the SESS.

Optionally, even though the SESS is dedicated to cranking operations, the controller may be configured to enlist the SESS to power one or more non-cranking loads in exceptional circumstances, such as if the controller determines that the primary battery is not able to provide sufficient power to an auxiliary load that is deemed high priority, such as the control system. For example, the SESS may be used to back-up the primary battery for powering loads critical for ensuring safety, such as control instruments, vehicle monitoring sensors, computing equipment, and the like. In an embodiment, if the primary battery is sufficiently depleted, one or more computing devices (e.g., computer, onboard workstation, server, etc.) onboard the vehicle that contain the controller may shut down due to lack of power. In the control assist mode, an external input may be provided to actuate the switch devices to enable the SESS to supply current for powering critical loads, including the computing device(s) that contain the controller. The external input may be provided by a user input device, such as a push button on a control panel, a breaker on a circuit breaker, or the like, as described in FIG. 6.

In one or more embodiments, the controller determines the allocation of responsibility for powering a cranking operation based at least in part on monitored properties of the primary battery and/or the SESS. Typically the SESS is fully charged, but the primary battery may be depleted due to powering auxiliary loads. In one or more embodiments, the primary battery is designated as the default power source for cranking operations. If the sensor signals received from the one or more sensors indicate that both the primary battery and the SESS are strong, the controller may utilize the primary battery, by default, to power the cranking load. The "strong" determination may represent a healthy energy storage device that has at least a threshold state of charge, such as but not limited to at least 60%, 70%, or at least 80% of the charge capacity, or at least a threshold amount of electrical energy available for discharge to the cranking load. The controller may evaluate primary battery strength by monitoring voltage drops during high current draw events, such as the engine cranking operation or an engine pre-lube operation. The controller can discharge electric current from the primary battery to power the cranking load by closing the switch devices BS−, BS+, and Cp to establish a closed conductive path from the primary battery to the cranking load. The controller can maintain the other switch devices (e.g., SESS discharge switch Cb, charge switch, etc.) in the open, non-conducting state to keep the SESS isolated from the primary battery and the cranking load while the primary battery powers the cranking load. While the primary battery powers the cranking load, the controller may monitor the properties of the primary battery.

If a property of the primary battery indicates that the primary battery is weak or depleted during a cranking operation, the controller may utilize the SESS to assist with powering the cranking load as an exception condition. The controller may determine that the primary battery is weak or depleted based on a voltage of the primary battery dropping beyond a designated control minimum voltage level (e.g., 246 in FIG. 4), dropping at a faster rate than expected, or the like. In a non-limiting example, the minimum voltage level may be 55 V. Optionally, the controller may determine that the primary battery is weak or depleted based on other properties, such as the current discharged from the primary battery being less than a designated current level, not spiking as quickly as expected, or detecting a temperature of the primary battery that exceeds a designated threshold temperature. Battery voltage drop during loadings is another way to identify a weak battery. The controller may utilize the SESS in this situation to back-up the primary battery to ensure that sufficient power is provided to successfully start-up the engine. The SESS may backup the primary battery by the controller closing the SESS discharge switch Cb, while retaining the primary discharge switch Cp in the closed state, which causes both the primary battery and the SESS to concurrently discharge electric current onto the circuit for powering the cranking load.

In another option, the controller may block the current discharge from the primary battery by opening the primary discharge switch Cp prior to closing the SESS discharge switch Cb to begin the current discharge from the SESS. For example, the controller optionally may control the switch devices in a break-before-make order of operations to keep the primary battery discharge separate from the SESS discharge, ensuring that the cranking load is powered by only one power source at a time.

Optionally, even if the primary battery is deemed healthy and able to successfully power an upcoming cranking operation, the controller may select the SESS to power a cranking operation on occasion instead of the primary battery as a periodic health check for the SESS. For example, cranking operations may be relatively infrequent as it is possible for vehicles to sit for extended periods with no need to crank the engine between trips with all or most loads disconnected. Especially if the primary battery is the default source of cranking power, the SESS may remain dormant for long periods of time. To ensure that the SESS is healthy and fully functional, the controller may periodically utilize the SESS to power a cranking operation, such as once a week or month, once every five or ten cranking operations, or the like. The controller may also track the time elapsed from a previous cranking operation powered by the SESS, and select the SESS to power a next cranking operation in response to determining that the elapsed time exceeds a designated interval, such as one week or one month. During the periodic health check in which the SESS is used to power the cranking load, the primary battery can back-up the SESS to provide power if necessary, to ensure that the cranking operation is successful.

Referring now back to the start of the cranking operation, if on the other hand the sensor signals received from the one or more sensors indicate that one of the primary battery or the SESS is weak or depleted, the controller may select the stronger of the two storage systems to power the cranking operation. For example, if the properties indicate that the SESS has a greater available amount of electrical energy for powering the cranking load than the primary battery, the controller may select the SESS for powering the cranking load instead of the primary battery. As such, the controller opens one or more of the switch devices, and closes the SESS discharge switch Cb and the individual switch devices associated with the battery cells of the SESS in FIG. 5 to discharge current from the SESS without discharging current from the primary battery. During the cranking operation, the controller may enlist the primary battery to assist the SESS if necessary, based on the monitored properties of the SESS. For example, if the controller determines that the SESS is faltering, the controller can start to discharge current from the primary battery to supplement the current discharged by the SESS or replace the current discharged by the SESS.

In another example, if the sensor signals indicate that both the primary battery and the SESS are weak or depleted, the controller may select both the primary battery and the SESS for powering the cranking load. For example, the controller may close both the primary and SESS discharge switches Cp and Cb to concurrently discharge current from the primary battery and the SESS onto the circuit to power the cranking load.

In the example above, the primary battery is the default energy storage system for powering cranking loads. In an alternative embodiment, the SESS is designated as the default energy storage system for engine cranking purposes. As such, if both the primary battery and the SESS are deemed healthy or strong, then the controller may use the SESS to power the cranking operation and may use the primary battery as needed to back-up the SESS. For example, after determining that the SESS is healthy or strong, the controller may control the switch devices to electrically disconnect the primary battery from the SESS (or maintain in a disconnected state) and block (or keep blocking) the primary battery from supplying electric current to power the cranking load. Then, the controller may control the switch devices to electrically connect the SESS to the cranking load to discharge current from the SESS for powering the cranking load. After the cranking operation, the controller may control the primary and SESS discharge switches Cp and Cb to achieve or maintain the open position to disconnect the cranking load from the primary battery and the SESS.

Besides reducing the risk of cranking failure, incorporating the SESS as described herein to assist with cranking may have beneficial effects on the primary battery. For example, the primary battery may have an extended operational life due to the reduced burden of cranking. In addition, the presence of the SESS for cranking may enable vehicles to reduce the size and capacity of the primary battery because the primary battery may no longer need the capability to independently deliver high current for cranking. Alternatively, without the need for a high discharge capability, the primary battery selected for the application may be a deep discharge type with longer life expectation characteristics.

Figure 6:
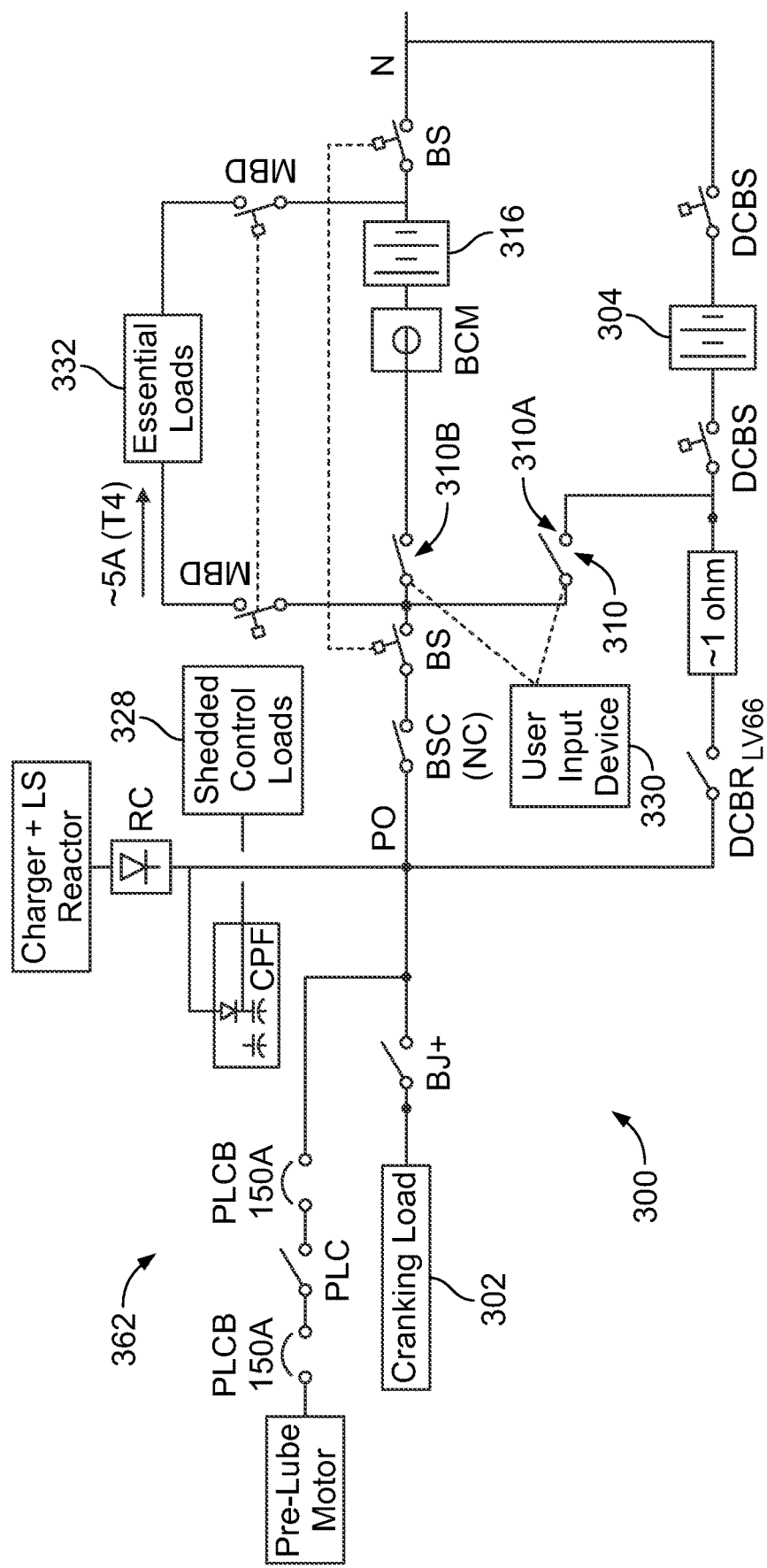
FIG. 6 is a circuit diagram showing the cranking system of FIG. 5 according to an embodiment.

FIG. 6 is a circuit diagram 326 showing the cranking system 300 according to an embodiment. In the illustrated embodiment, the cranking system includes a user input device 330 that is used by an operator to manually electrically connect the SESS 304 to the various loads onboard the vehicle, at least temporarily, for powering one or more of the loads during a control assist mode. The loads may include the cranking load 302, shedded control loads 328, and essential loads 332. The control system, including the controller, shown in FIG. 5 is within the shedded control loads. For example, the shedded control loads include computing devices, circuitry, and the like for controlling the operations of the cranking system, including the conveyance of electric current between the loads, the primary battery 316, and the SESS 304.

As described above, the SESS typically is dormant in a charged state unless utilized to support the cranking operation. The primary battery is typically utilized to power most loads, including the shedded control loads and the essential loads. The cranking load may require significantly more power than the shedded control loads. For example, successful cranking may require around 1000 A, while the control loads may use only about 20-30 A. Generally, the primary battery has sufficient charge to power the control loads, including the controller, even in a diminished state in which the primary battery is unable to independently crank the engine. However, it is possible that the primary battery may become depleted to a state in which the primary battery is essentially "dead" and unable to power even the relatively nominal control loads. In that case, the computing devices that contain the controller may shut down, and the controller becomes inoperable. The controller in the inoperable state is unable to control the flow of current through the circuit by actuating the switch devices. For example, although the SESS may be charged, the controller is not able to close the SESS discharge switch 310A to establish the conductive path from the SESS to the loads.

In the illustrated embodiment, the user input device is an electromechanical device that is manually-actuatable to electrically connect the SESS to one or more of the loads onboard the vehicle. Actuating the user input device closes the SESS discharge switch to establish a conductive path for supplying current from the SESS to at least the shedded control loads that include the controller. The user input device may be a circuit breaker with a push button, lever, physical switch, toggle, knob, or the like for selectively manually actuating the circuit breaker. The push button, lever, switch, toggle, knob, etc. may be disposed on a control panel onboard the vehicle.

In an embodiment, upon manual actuation of the user input device (e.g., pushing the button), the user input device automatically closes the SESS discharge switch 310A and opens the primary discharge switch 310B. As a result, the primary battery is electrically disconnected from the loads, and the SESS is electrically connected to the loads. Optionally, the user input device may be designed to open the primary discharge switch prior to closing the SESS discharge switch. Disconnecting the primary battery avoids circulating currents and ensures that the current from the SESS is going to be delivered to the control loads that need the power first, without being diverted for charging the primary battery. Manual actuation of the user input device initiates the control assist mode of the cranking system.

During the control assist mode, the SESS supplies electric current (through the SESS discharge switch) that powers the shedded control loads, such that the controller becomes functional and operable. For example, the computing device (s) that contain the controller may boot up. Once operable, the controller may determine, based on the state of the switch devices and/or the state of the primary battery, that the cranking system is in the control assist mode, being powered by the SESS. With the controller operable, the controller may reassert control over the switch devices to control current flow through the circuit. The next step is to perform the cranking operation to attempt to start the engine. The controller may automatically direct the performance of the cranking operation in response to actuation of the user input device. Alternatively, a second user input device may be utilized specifically to initiate the cranking operation. As such, a user may actuate the first user input device when the primary battery is depleted to power the control loads by the SESS, and then the user may actuate the second user input device to signal the cranking operation.

In an embodiment, the controller may utilize the SESS to power all, or at least a portion, of the cranking operation while in the control assist mode due to the condition of the primary battery. The controller may limit the use of the SESS for cranking in order to extend the lifetime of the SESS. As described above, cranking can be hard on energy storage devices, and can degrade capacity and reduce life. One of the limitations or constrains designed to reduce the risk of harm on the SESS may be to apply a crank limit per a given period of time. For example, the controller may limit the SESS to participating in only one or two cranking operations per day. After a cranking operation that uses the SESS, the controller may store a log or record of the details in a memory device (e.g., the memory of the control system in FIG. 5).

If the limit has been reached, then the next time a cranking operation is requested within the same time period, the controller determines based on the memory that the limit has been reached. As a result, the controller prohibits the SESS from participating in the cranking operation. For example, the controller may open the SESS discharge switch to break the conductive pathway, isolating the SESS. This limit may protect the SESS from degradation that could result from repetitive cranking attempts. Another limitation or constraint may be that the state of charge in the SESS is at least a designated threshold. For example, the threshold may be 70%, 80%, or the like, of the charge capacity. The controller may monitor the state of charge of the SESS based on at least one of the sensors. If the amount of charge in the SESS is less than the threshold, then the controller prohibits the SESS from participating in the cranking operation. If any of the limitations or constraints that are requirements are unsatisfied (e.g., the crank limit is reached), the controller may notify the user that the cranking operation will not be performed. For example, the controller may generate a control signal that causes an output device, such as a smartphone, computer, onboard display, audio speaker, or the like to alert the user. The alert or notification may be a text message displayed on a graphical user interface, an audio message emitted from a speaker, or the like.

If all of the limitations or constraints are satisfied, the controller may control the switch devices to cause the SESS to supply electric current to the cranking load during the cranking operation. For example, the controller may close the switch device BJ+ in FIG. 6 (referred to herein as cranking load switch) to provide a conductive path from the SESS to the cranking load. Optionally, the controller may keep the primary discharge switch 310B in the open, non-conductive state during the cranking operation such that only the SESS powers the cranking operation. For example, the primary battery would be in a depleted or at least weakened state while in the control assist mode, so the primary battery would not likely be able to provide much assistance for cranking until the primary battery is able to charge. Alternatively, the controller may close the primary discharge switch to cause the primary battery to supply electric current to the cranking load concurrently with the current supplied by the SESS through the SESS discharge switch 310A.

If the cranking operation is successful at starting the engine, then the engine can be used to recharge the primary battery and the controller may switch back to a normal operating mode. In the normal operating mode, the primary battery is used to power most, if not all, vehicle loads. For example, the controller may open the SESS discharge switch to electrically disconnect the SESS from the loads and the primary battery, and may close the primary discharge switch. The controller may switch from the SESS powering the loads to the primary battery powering the loads after a designated amount of time has accrued after actuation of the user input device. The designated amount of time may be on the order of minutes, such as ten minutes. The SESS is taken offline again to conserve the operational life of the SESS. In this way, the SESS is used to provide necessary backup power to the vehicle for a limited amount of time.

Because the user input device is a manually-operated electromechanical device, a user may actuate the user input device even while the primary battery is in a healthy, charged condition. In one embodiment, the circuit may include a disconnect switch device that essentially disconnects the user input device when the disconnect switch device is activated by receiving a certain voltage. As such, if the cranking system is in the normal operating mode, the controller may direct a sufficient amount of power to the disconnect switch device to make the user input device inoperable (e.g., disconnected from the circuit). In the event of a power outage due to a depleted primary battery, the disconnect switch may automatically actuate, making the user input device operable to close the SESS discharge switch upon manual actuation, as described. In another embodiment, the user input device may be always connected to the circuit and operable. Thus, the user input device may close the SESS discharge switch for a designated period of time (e.g., 10 seconds) every time the manual input is received. To discourage repeated manual actuation, the controller may generate a control signal that provides a notification to the user to modify the user's behavior (e.g., stop pressing the push button).

In one or more embodiments, the SESS may be charged by the primary battery. For example, when the SESS is depleted after a cranking operation, the controller may charge the SESS by closing the charge switch 310C to establish a closed conductive path between the primary battery and the SESS along the charge circuit. Current is discharged from the primary battery to the SESS. The charge circuit may include the charge resistor 322A that passively limits the electric current that is supplied from the charge circuit of the SESS during the charging operation. In the illustrated embodiment, the charge resistor has a relatively high resistance (e.g., high impedance) to extend battery life and simplify the charging circuit. Because the SESS may be infrequently utilized/discharged, the charge rate can be relatively slow, which is better for battery health than higher current level. The charge resistor has a 1 ohm resistance in the illustrated embodiment, but may have a different resistance in another embodiment. The controller may analyze the sensor signals from the sensors to ensure that the voltage of the primary battery is greater than the SESS prior to starting the charging operation. Optionally, the charge circuit may include a diode that permits current flow only from the primary battery to the SESS. The diode may block electric current conduction from the SESS to the primary battery.

The controller may monitor the properties of the SESS during charging and may also monitor a charging duration from the start of the charging operation. Once the controller determines that SESS has achieved a designated fully charged state based on the voltage, state of charge, or the like, the controller may open the charge switch 310C to break the conductive path along the charge circuit and block the discharge of electric current from the primary battery to the SESS. Optionally, controller may be configured to open the charge relay prior to the SESS achieving the fully charged state in response to the charging duration surpassing a designated time limit, such as two hours, four hours, or the like. The designated time limit may be useful to prevent excessive charging and/or component damage in the event of a sensor failure. The controller may also be configured to terminate the charging operation prematurely, by opening the charge relay to disconnect the resistor and the SESS from the primary battery, in response to a determined voltage differential between the primary battery and the SESS exceeding a designated threshold. For example, an excessive voltage differential may thermally stress the charge resistor, and could damage the resistor.

In an embodiment, the controller may charge the SESS using excess voltage while the primary battery is charged. For example, while the primary battery is charging, the controller may monitor the properties of the primary battery, such as voltage, current flow, temperature, and/or the like. In response to determining that the voltage of the primary battery exceeds a designated threshold voltage, such as but not limited to 65 V, the controller may close the charge relay along the charge circuit to establish the closed conductive path from the primary device to the SESS. As a result, excess electric current is discharged from the primary battery to the SESS to charge the SESS. Optionally, instead of concurrent with the primary battery charging, the controller may wait until after the charging of the primary battery is complete before closing the charge relay to direct the excess current to the SESS. The controller may also charge the SESS with excess electric current in response to determining that the primary battery is receiving electric current at an excessive rate.

In order to extend battery life, a charging strategy which avoids charging at high battery temperatures may be deployed. For example, the controller may receive sensor signals from a temperature sensor (e.g., sensor 312A) that monitors a temperature of the primary battery. The controller may determine the temperature of the primary battery based on the sensor signals received from the temperature sensor. If the temperature of the primary battery is at or above a designated threshold temperature, the controller may prevent charging of the primary battery until the temperature of the primary battery drops below the threshold temperature. Non-limiting examples of the threshold temperature can include 200° C. (392° F.), 300° C. (572° F.), or the like. In one embodiment, the controller may not charge the SESS while the primary battery temperature is excessively high either. For example, in circuit arrangements in which the SESS is charged by electrical energy supplied by the primary battery, removing the load of the charging SESS from the primary battery during time periods that the primary battery has excessive temperature (at or above the designated temperature threshold) can extend the life of the primary battery.

In an alternative embodiment, the controller may still charge the SESS during time periods that the primary battery has an excessive temperature, particularly in circuit arrangements in which charging current is not supplied by the primary battery. For example, the controller may direct charging current to bypass the primary battery and enter the SESS.

Optionally, during the time periods that the primary battery has the excessive temperature, the controller may utilize the SESS as the default power source for engine cranking operations. If a cranking operation occurs when the primary battery has excessive temperature, the primary battery may be utilized only as a backup to the SESS to provide power if the SESS is faltering.

Optionally, the controller may receive sensor signals indicative of ambient temperature in the surrounding environment. In response to the ambient temperature being greater than a threshold ambient temperature, the controller may avoid charging the SESS to extend SESS battery life. The threshold ambient temperature may be selected based on characteristics of the SESS. Non-limiting examples of the threshold ambient temperature include 40° C. (104° F.), 50° C. (122° F.), or the like.

The controller may terminate the charging of the SESS by opening the charge switch 310C which blocks conduction along the charge circuit. The controller may maintain the SESS in the electrically disconnected and charged state until the next duty cycle. By charging the SESS using the primary battery and existing charging system, no additional hardware may be needed to install and operate the cranking system other than the SESS and associated circuitry that is not already present on the vehicle. For example, the SESS may not require a separate charger system or device than the charger used with the primary device.

Figure 7:
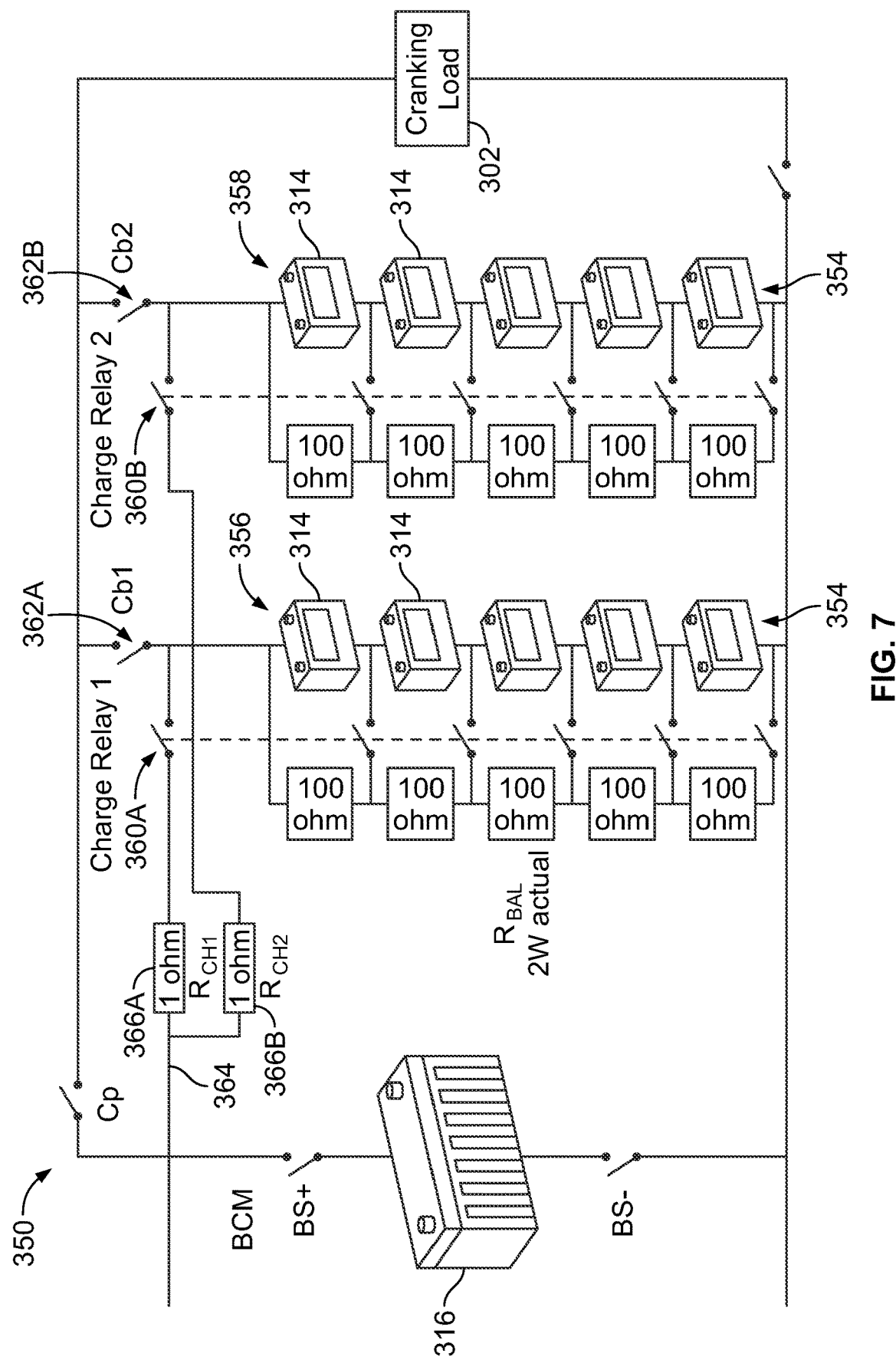
FIG. 7 is a circuit diagram showing a cranking system according to an embodiment.

FIG. 7 is a circuit diagram showing a cranking system 350 according to an embodiment. The cranking system 350 is similar to the cranking system 300 shown in FIGS. 5 and 6 except in the arrangement of the secondary energy storage system (SESS) 354. In the illustrated embodiment, the SESS includes a first string 356 and a second string 358 of one or more battery cells 314. The first and second strings are arranged in parallel with each other, and in parallel with the primary battery 316. Each of the first and second strings includes five battery cells arranged in series in the illustrated embodiment, but may have at few as one or more than five in other embodiments. In addition, the first string may have a different number of battery cells or one or more different types or sizes of battery cells than the second string. Optionally, at least one of the first string of the second string may include at least one capacitor.

The cranking system 350 may be configured to independently charge and discharge the first string of the SESS relative to the second string of the SESS, and vice-versa. For example, the control system includes a first charge switch 360A and first discharge switch 362A (Cb1) associated with the first string, and a second charge switch 360B and second discharge switch 362B (Cb2) associated with the second string. The control system closes the first charge switch to charge the first string from current discharged by the primary battery, and closes the second charge switch to charge the second string. The control system closes the first discharge switch Cb1 to discharge current from the first string to power the cranking load 302, and closes the second discharge switch Cb2 to power the cranking load with electric current discharged from the second string. In the illustrated embodiment, the charge circuit 364 includes a first charge resistor 366A electrically connected to the first string and a second charge resistor 366B electrically connected to the second string. The SESS may include more than three strings of batteries and/or capacitors in parallel in other embodiments.

Figure 8:
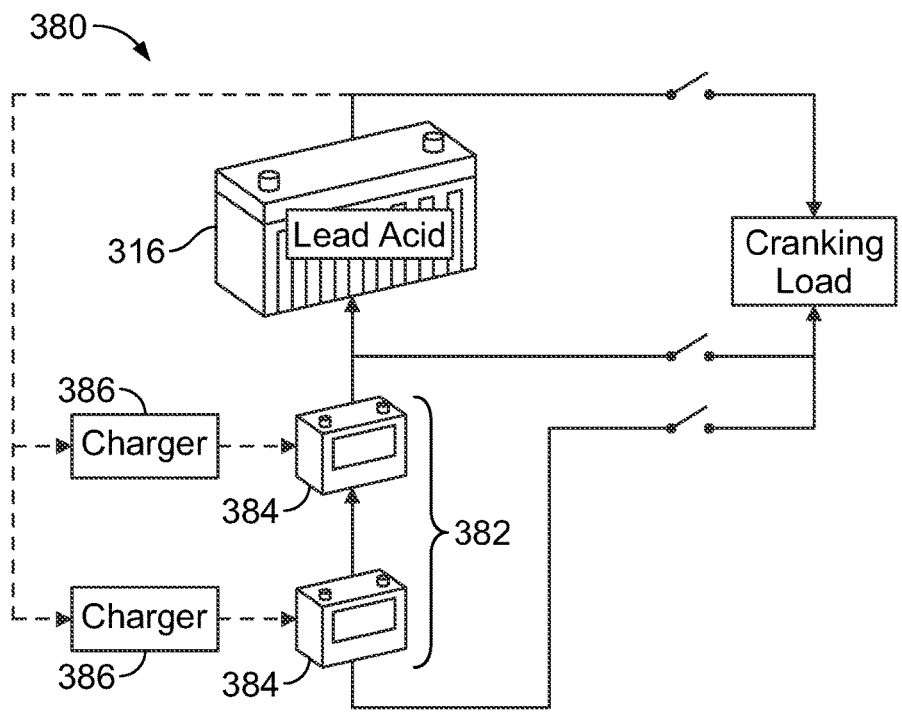
FIG. 8 illustrates a cranking system according to an alternative embodiment.

FIG. 8 illustrates a cranking system 380 according to an alternative embodiment. In the cranking system 380, the secondary energy storage system (SESS) 382 may be connected in series with the primary battery 316, instead of in parallel as shown in FIGS. 5 through 7. The SESS 382 may include two or more battery cells 384 connected to each other in series. The cranking system may have multiple chargers 386, with each battery cell 384 having a different associated charger.

Figure 9:
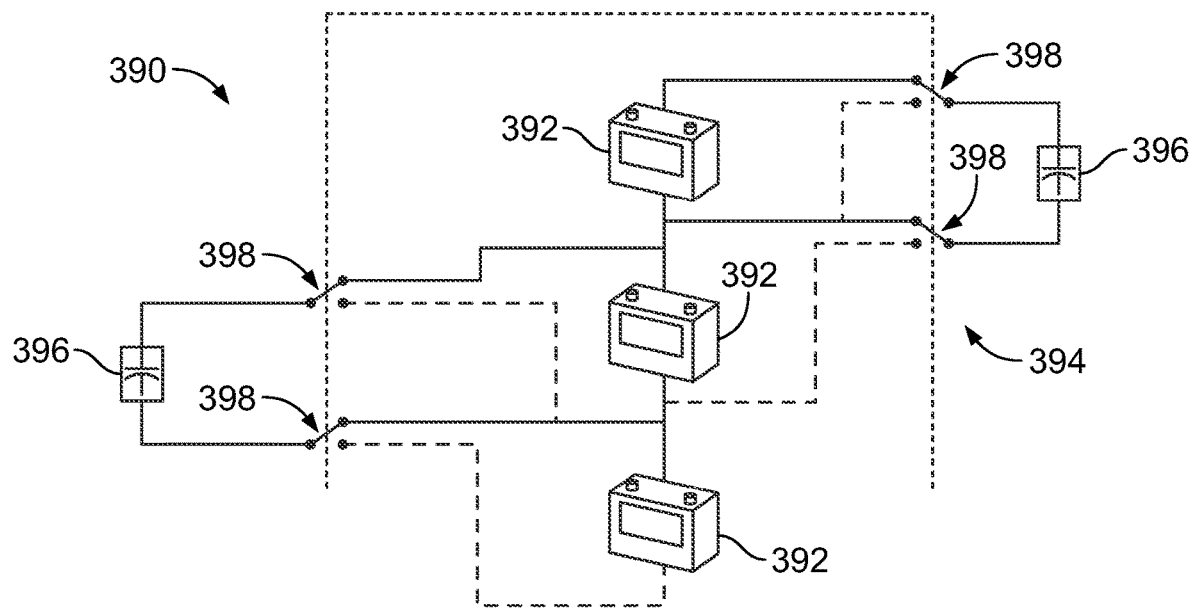
FIG. 9 is a balancing scheme that can be used to balance the voltage within multiple battery cells of a secondary energy storage system (SESS)

FIG. 9 is a balancing scheme 390 that can be used to balance the voltage within multiple battery cells 392 of a secondary energy storage system (SESS) 394. The SESS in the illustrated embodiment includes three battery cells and two capacitors 396. Four switch devices 398 may be controlled by the controller to balance the electrical energy among the battery cells. Optionally, no balancing may be performed for the SESS.

Figure 10:
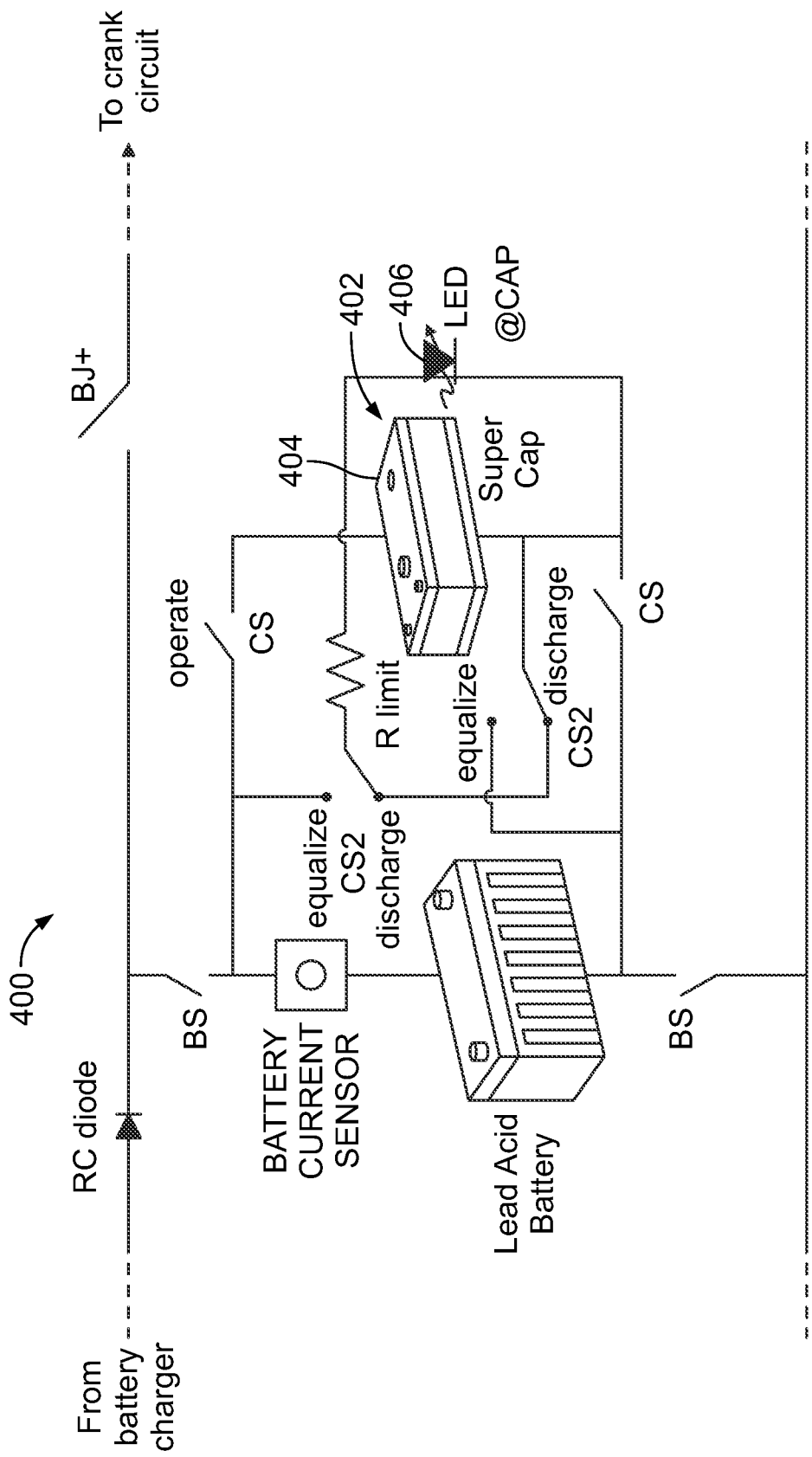
FIG. 10 is a circuit diagram showing a cranking system according to an embodiment.

FIG. 10 is a circuit diagram showing a cranking system 400 according to an embodiment. The cranking system 400 may be similar to the cranking system 300 shown in FIG. 5. Optionally, a secondary energy storage system (SESS) 402 of the cranking system includes one or more super capacitors 404, instead of the string of batteries shown in FIG. 5. The SESS may include a light emitting diode (LED) 406 associated with the super capacitor. The circuitry shown in FIG. 10 is similar to the circuitry in FIG. 5, such that the description of how the cranking system operates in FIG. 5 may apply to the cranking system in FIG. 10.

Figure 11:
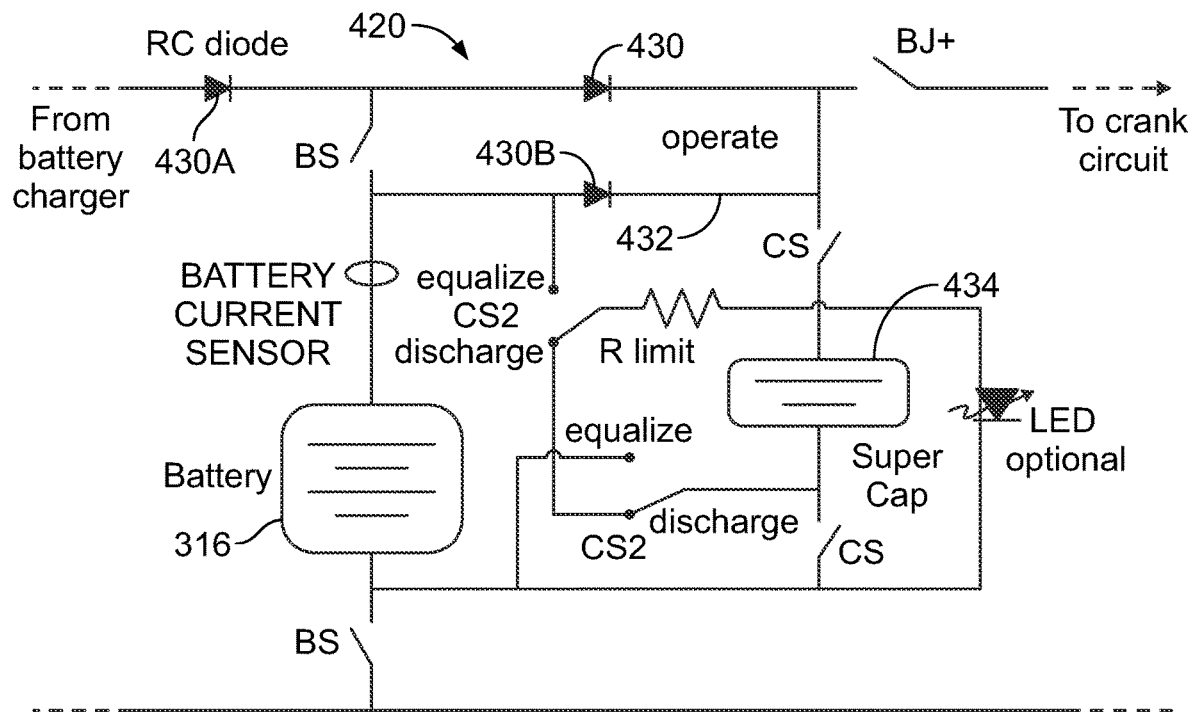
FIG. 11 is a circuit diagram showing a cranking system according to an embodiment.
Figure 12:
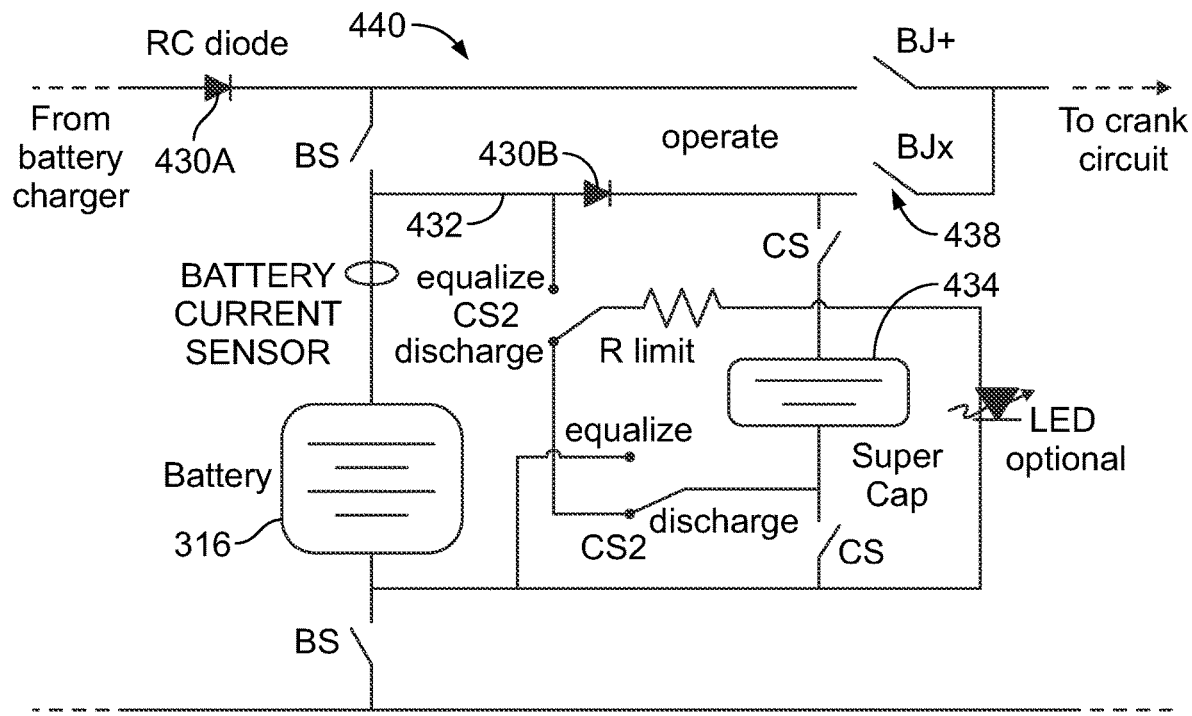
FIG. 12 is a circuit diagram showing a cranking system according to an embodiment.

FIG. 11 is a circuit diagram showing a cranking system 420 according to an embodiment. The addition of parallel diodes 430B and 430C ensure that a highest voltage applied to the primary battery during its most recent recharge is retained across the super capacitor and applied during the next engine crank. Retaining the highest voltage from the previous recharge across the super capacitor for that voltage to be applied during the subsequent crank operation ensures that sufficient energy (e.g., the maximum energy available) is provided for the subsequent cranking operation. FIG. 12 is a circuit diagram showing a cranking system 440 according to another embodiment. The cranking systems 420 and 440 are similar to the cranking system 400 shown in FIG. 10, except that the cranking systems 420, 440 include diodes 430 for providing unidirectional current flow along the conductive pathways. For example, the cranking systems both include an RC diode 430A for blocking electric current conduction towards the battery charger, and a charge diode 430B disposed along a charge circuit path 432 for blocking electric current conduction from the SESS 434 towards the primary battery 316. The cranking system in FIG. 12 also includes an additional switch device BJx 438 that is not present in the cranking system described in FIG. 11. The cranking systems in FIGS. 11 and 12 may operate similar to the cranking system in FIG. 10 and the cranking system in FIG. 5 where the controller may determine when and how long to supply energy stored in the super capacitor for engine cranking. Both systems are similar in that the primary battery charger can raise the energy stored in the capacitor by retaining the charger's maximum voltage typically applied during primary battery bulk charging. The high voltage energy retained by the capacitor may be available for use during subsequent engine cranks.

Figure 13:
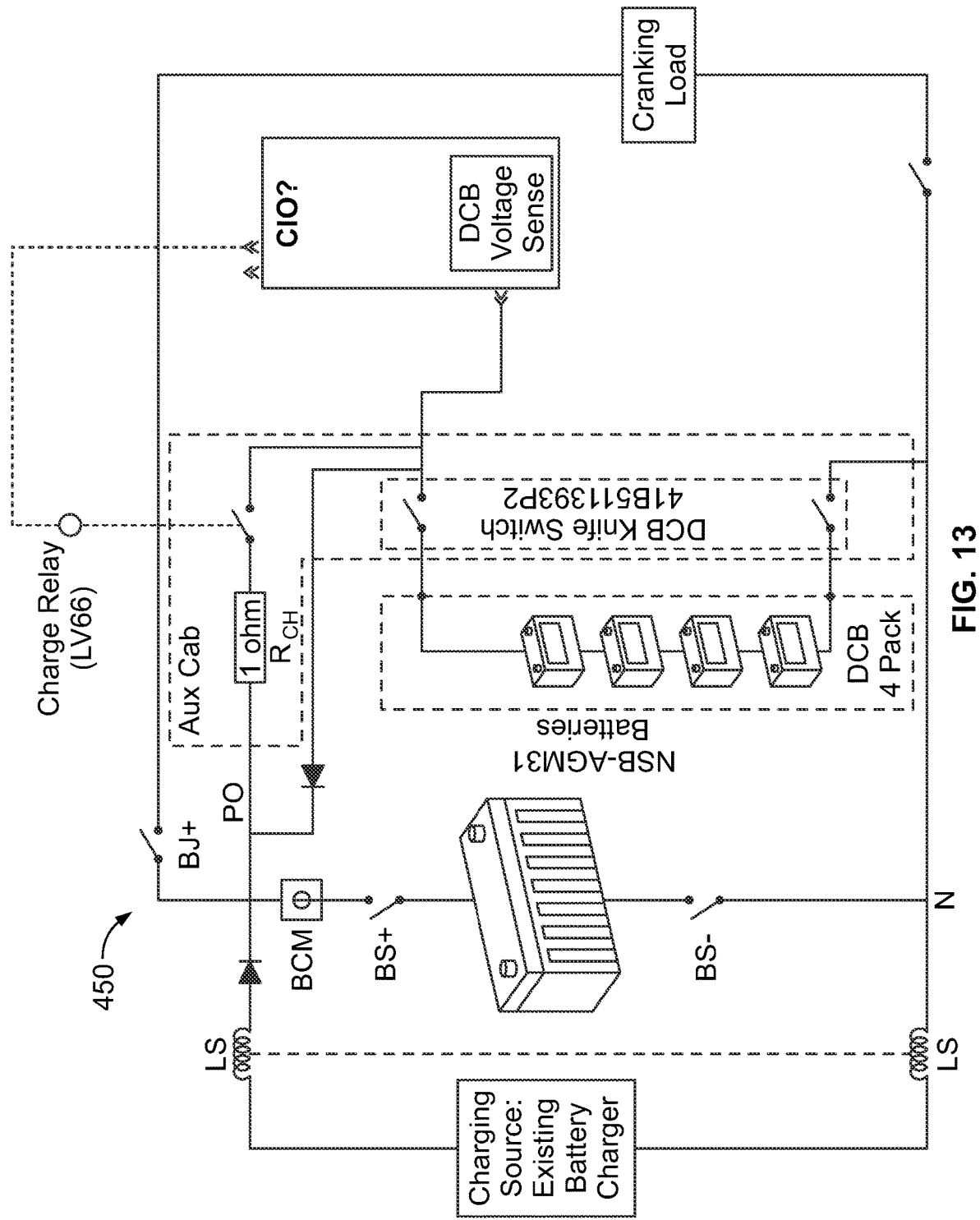
FIG. 13 depicts a circuit diagram showing a cranking system according to another embodiment.
Figure 14:
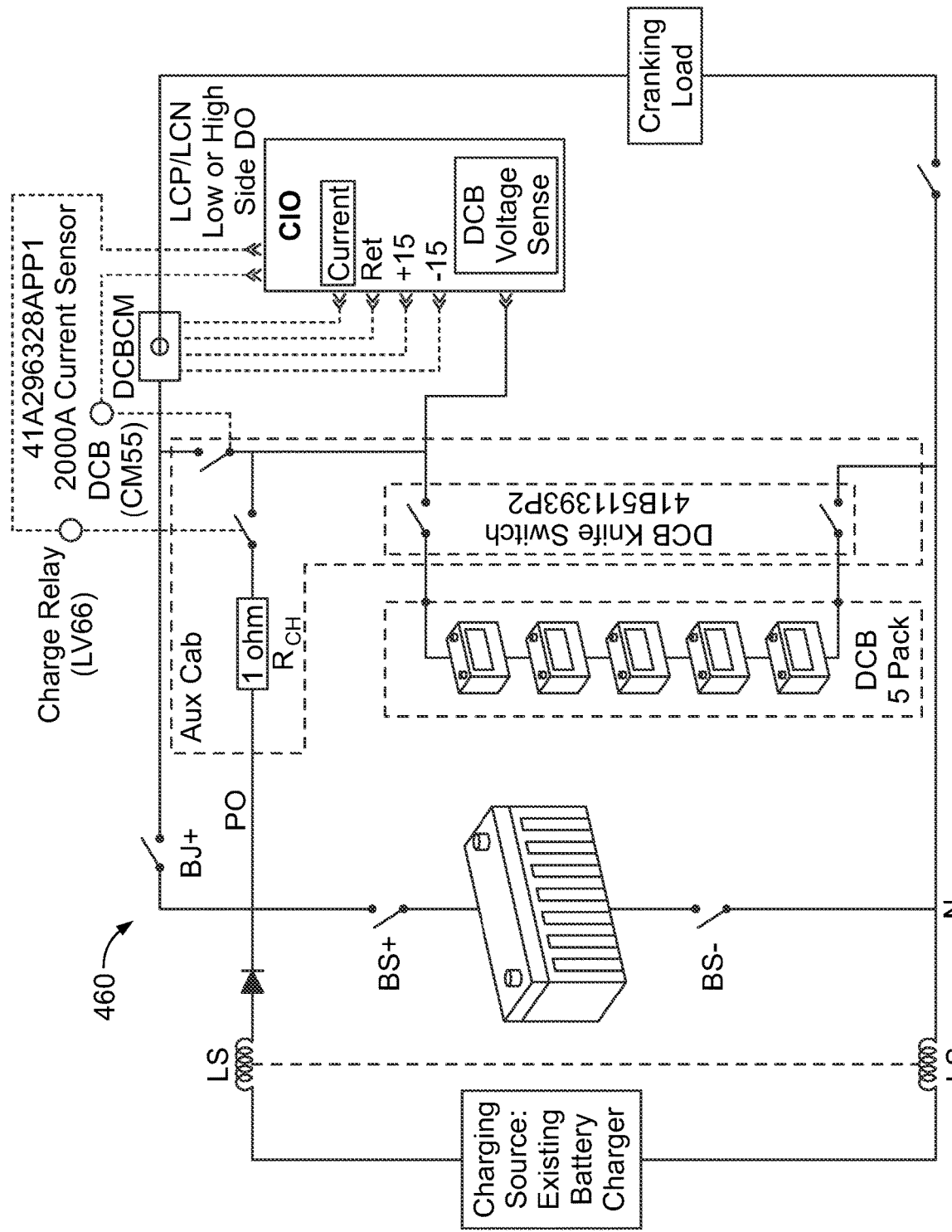
FIG. 14 depicts a circuit diagram showing a cranking system according to another embodiment.

FIGS. 13 and 14 depict circuit diagrams showing respective cranking systems 450, 460 according to other embodiments.

Figure 15:
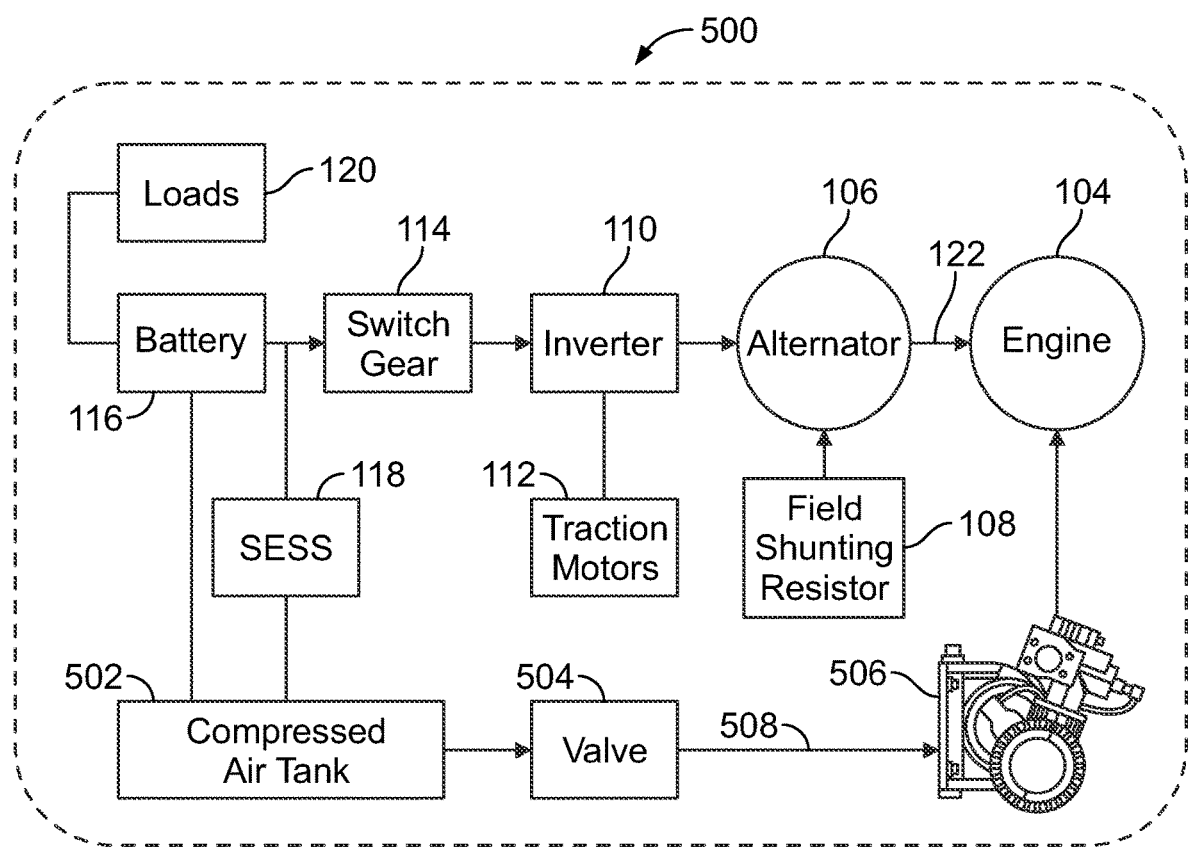
FIG. 15 illustrates a power delivery system according to an embodiment.

FIG. 15 illustrates a power delivery system 500 according to an embodiment. The power delivery system 500 may be similar to the power delivery system 100 shown in FIG. 1, and like components are labeled the same for comparison. In the illustrated embodiment, the engine 104 may be cranked using a cranking device 506 that is separate and discrete from the alternator 106. For example, the cranking device 506 may be an air start motor that is mechanically connected to the shaft of the engine. The air start motor is pneumatically connected via a tube or hose 508 to a valve 504 and a compressed air tank 502. The compressed air tank stores compressed air that is supplied through the valve and the hose to the air start motor, which rotates the engine shaft during a cranking operation. The compressed air tank may have an associated motor that compresses the air. In one embodiment, the air in the tank is compressed and stored while the engine was previously running. Then, while the engine is shut down, the stored compressed air can be selectively supplied via the hose to the air start motor. The air start motor converts the compressed air to mechanical energy for cranking the engine. Optionally, while the engine is shutdown, the primary battery 116 and/or the SESS 118 may be controlled by the controller to power the compression of air which is supplied to the air start motor for the cranking operation. For example, the SESS may discharge electric current to the motor integrated with the compressed air tank for powering air compression and storage in the tank. The pneumatic system allows a sustained low power electrical energy source to deliver a high power burst to crank the engine. The motor associated with the compressed air tank may represent the cranking load 302 shown in FIG. 5.

Figure 16:
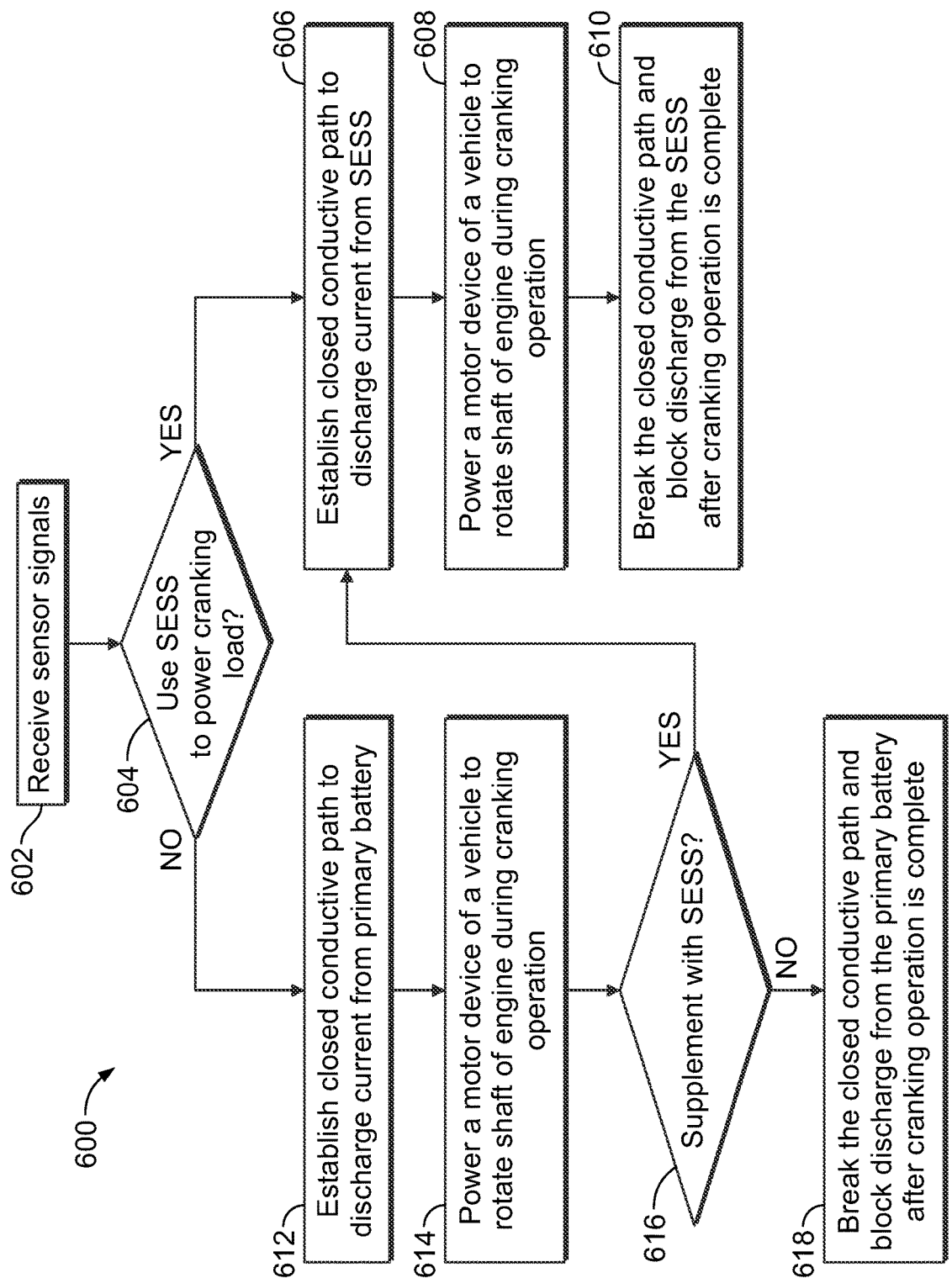
FIG. 16 is a flow chart of a method for cranking an engine according to an embodiment.

FIG. 16 is a flow chart 600 of a method for cranking an engine according to an embodiment. Various steps of the method may be performed by the one or more processors 318 of the controller 308 shown in FIG. 5. The method may include additional steps than shown in FIG. 16, fewer steps than shown in FIG. 16, and/or different steps than the steps shown in FIG. 16. At step 602, sensor signals are received. The sensor signals may be generated by one or more sensors that monitor a primary battery and/or a secondary energy storage system (SESS). The sensor signals indicate one or more properties or parameters of the primary battery and/or the SESS, such as voltage, current, temperature, and/or the like.

At step 604, a determination is made whether to use the SESS to power a cranking load, which refers to the external component or components used to power rotation of a shaft of an internal combustion engine during engine start-up. The determination may be made based on the sensor signals. For example, if the SESS has a greater voltage or available amount of electrical energy for cranking than the primary battery, the SESS may be selected such that flow processed to step 606. In another example, if the sensor signals indicate that a voltage of the primary battery is below a designated threshold, then the SESS is selected. In another embodiment, the SESS may be designated as the default energy storage device to power the cranking load, so the flow proceeds to step 606. The SESS also may be selected due to a periodic health test to check that the SESS is fully functional and healthy.

At step 606, a closed conductive path is established from the SESS to the cranking load via switch devices. The switch devices may be controlled by one or more processors. Electric current from the SESS may be discharged along the closed conductive path to power the cranking load. Optionally, the SESS may be controlled by the switch devices and the processors to remain in an electrically isolated state except: (i) during the cranking operation, and (ii) during a charging operation in which the SESS receives electric current. Optionally, the switch devices may be controlled to electrically disconnect the primary battery from the SESS and from the cranking load prior to establishing the closed conductive path from the SESS to the cranking load, which blocks the primary battery from discharging electric current during the cranking operation.

At step 608, a cranking device of the vehicle is powered, via the electric current that is discharged from the SESS, to rotate a shaft of an internal combustion engine during the cranking operation. The cranking device may be an alternator functioning in a motoring mode, an air start motor, or the like.

At step 610, after the cranking operation is complete, the switch devices are controlled to break the closed conductive path and block discharge of additional the electric current from the SESS.

Referring back to the decision at step 604, if it is determined that the primary battery is to be used to power the cranking load, then flow proceeds to step 612. At step 612, a second closed conductive path is established from the primary battery to the cranking load via switch devices. Electric current that is discharged from the primary battery onto the second closed conductive path powers the cranking device during the cranking operation. At step 614, the cranking device of the vehicle is powered, via the electric current that is discharged from the primary battery, to rotate the shaft of the engine during the cranking operation.

At step 616, it is determined whether the primary battery should be supplemented with the SESS during the cranking operation. For example, if the sensor signals indicate that the primary batter is faltering and may not be able to provide sufficient power to successfully crank the engine, it may be determined to use the SESS as a back-up to supplement the primary battery or replace the primary battery. If the answer is "yes", flow proceeds to step 606, and the (first) closed conductive path is established which may result in both the primary and the SESS concurrently discharging electric current to power the cranking load. If, on the other hand, the answer at step 616 is "no", flow proceeds to step 618. The primary battery continues to supply electric current until the cranking operation is complete. At step 618, after the cranking operation is complete, the second closed conductive path is broken by the switch devices and additional discharge of current from the primary battery is blocked.

Optionally, the method may include charging steps for replenishing the electrical energy stored in the SESS. For example, the method may include passively-limiting electric current that is supplied to the SESS during a charging operation via a resistor on a charge circuit that electrically connects the SESS to the primary battery. Responsive to a voltage differential between the primary battery and the SESS exceeding a designated threshold, the method includes controlling the switch devices to disconnect the resistor.

Optionally, the method includes monitoring a duration of a charging operation starting at a time that a closed conductive path is established on a charge circuit between the primary battery and the SESS, and controlling the switch devices to break the second closed conductive path between the primary battery and the SESS in response to the duration surpassing a designated time limit.

Optionally, during a charging operation, in response to determining based on the sensor signals that a voltage of the primary battery exceeds a designated threshold voltage, the method includes establishing, via the switch devices controlled by one or more processors, a closed conductive path along a charge circuit between the primary battery and the SESS to discharge excess electric current from the primary battery to the SESS.

In one or more embodiments, a cranking system is provided that includes a secondary energy storage system (SESS) and a control system. The SESS is configured to be disposed onboard a vehicle and conductively connected, via switch devices, to a primary battery and a cranking device of the vehicle. The control system is configured to control the switch devices to close a conductive path to discharge electric current from the SESS for powering the cranking device to rotate an engine shaft during a cranking operation. The control system is configured to control the switch devices to open the conductive path and prevent discharge of electric current from the SESS after the cranking operation is complete.

Optionally, the control system is configured to control the switch devices to maintain the SESS in an electrically isolated state except during the cranking operation, during a charging operation of the SESS, and during a designated time period after receiving power from the SESS in response to actuation of a user input device.

Optionally, the SESS includes one or more battery modules. The one or more battery modules of the SESS may include multiple battery modules connected in series. Optionally, the SESS includes one or more capacitors.

Optionally, the cranking system also includes the cranking device, which is an alternator onboard the vehicle. The electric current from the SESS is supplied to the alternator during the cranking operation. Optionally, the cranking system also includes the cranking device, which is an air start motor powered by compressed air to rotate the engine shaft during the cranking operation.

Optionally, the primary battery and the SESS are electrically connected in parallel. Alternatively, the primary battery and the SESS are electrically connected in series.

Optionally, the control system is configured to control the switch devices to electrically disconnect the primary battery from the SESS and prevent the primary battery from powering the cranking device during the cranking operation. The control system may be configured to control the switch devices to prevent the primary battery from powering the cranking device prior to closing the conductive path from the SESS to power the cranking device.

Optionally, the control system is configured to control the switch devices to close a second conductive path for the primary battery to power the cranking device concurrent with the SESS during the cranking operation.

Optionally, the cranking system includes a user input device that is electromechanically connected to a first switch device and a second switch device of the switch devices. Manual actuation of the user input device controls the first switch device to connect the SESS to the control system for powering the control system and controls the second switch device to disconnect the primary battery from the control system.

Optionally, the control system further includes one or more sensors configured to monitor a voltage of the primary battery. During the cranking operation, the control system may be configured to control the switch devices to close the conductive path for the SESS to power the cranking device in response to determining, based on sensor signals generated by the one or more sensors, that the voltage of the primary battery is below a designated threshold and/or that an excessive drop in the voltage of the primary battery occurred during a previous cranking operation.

Optionally, the control system is configured to control the switch devices to close the conductive path for the SESS to power the cranking device during the cranking operation as a periodic health check for the SESS.

Optionally, the control system is configured to control the switch devices to close the conductive path for the SESS to power the cranking device in response to determining that the SESS has a greater available amount of electrical energy than the primary battery for powering the cranking device.

Optionally, the SESS is electrically connected to the primary battery via a charge circuit. The charge circuit includes a resistor that is configured to passively limit charge current that is supplied to the SESS during a charging operation. In response to a voltage differential between the primary battery and the SESS exceeding a designated threshold, the control system may be configured to control the switch devices to disconnect the resistor. The charge circuit may include a diode configured to block electric current conduction from the SESS to the primary battery.

Optionally, the control system is configured to monitor a duration of a charging operation involving discharge of electric current from the primary battery to the SESS along a charge circuit. The control system is configured to control the switch devices to open the charge circuit and prevent the discharge of the electric current from the primary battery in response to the duration surpassing a designated time limit.

Optionally, the control system further includes one or more sensors configured to monitor a voltage of the primary battery. In response to the voltage of the primary battery exceeding a designated threshold voltage during a charging operation, the control system may be configured to control the switch devices to close a conductive path from the primary battery to the SESS to discharge excess electric current from the primary battery to the SESS.

In one or more embodiments, a method for cranking an engine is provided that includes controlling, via a control system, switch devices to close a conductive path to discharge electric current from an SESS to power a cranking device of a vehicle to rotate an engine shaft during a cranking operation. The SESS is configured to be disposed onboard the vehicle and conductively connected via the switch devices to a primary battery and the cranking device. The method includes controlling the switch devices to open the conductive path and prevent discharge of electric current from the SESS after the cranking operation is complete.

Optionally, the method also includes controlling the switch devices to maintain the SESS in an electrically isolated state except during the cranking operation, and controlling the switch devices to maintain the SESS in an electrically isolated state except during a charging operation of the SESS.

Optionally, the method also includes controlling the switch devices to electrically disconnect the primary battery from the SESS and prevent the primary battery from powering the cranking device during the cranking operation. The method may also include controlling the switch devices to prevent the discharge of the electric current from the primary battery prior to closing the conductive path to discharge the electric current from the SESS.

Optionally, the method also includes controlling the switch devices to close a second conductive path to discharge electric current from the primary battery to the cranking device concurrent with the SESS during the cranking operation.

Optionally, the method also includes receiving sensor signals generated by one or more sensors that monitor the primary battery. The switch devices may be controlled to close the conductive path to discharge the electric current from the SESS during the cranking operation in response to determining, via the control system and based on the sensor signals, that a voltage of the primary battery is below a designated threshold and/or that an excessive drop in the voltage of the primary battery occurred during a previous cranking operation.

Optionally, the method also includes passively-limiting electric current that is supplied to the SESS during a charging operation via a resistor on a charge circuit that electrically connects the SESS to the primary battery. Responsive to a voltage differential between the primary battery and the SESS exceeding a designated threshold, the method may include controlling the switch devices to disconnect the resistor.

Optionally, the method also includes monitoring a duration of a charging operation involving discharge of electric current from the primary battery to the SESS along a charge circuit, and controlling the switch devices to open the charge circuit and prevent the discharge of the electric current from the primary battery in response to the duration surpassing a designated time limit.

Optionally, the method also includes receiving sensor signals generated by one or more sensors that monitor the primary battery. In response to determining, based on the sensor signals, that a voltage of the primary battery exceeds a designated threshold voltage during a charging operation, the method may include controlling the switch devices to close a charge circuit between the primary battery and the SESS to discharge excess electric current from the primary battery to the SESS.

In one or more embodiments, a power delivery system is provided that includes an engine, an alternator, a primary battery, an SESS, and a control system. The engine includes an engine shaft and is configured to be disposed onboard a vehicle. The alternator is mechanically coupled to the engine shaft. The primary battery is conductively connected to the alternator via at least a first switch device. The SESS is conductively connected to the alternator via at least a second switch device. The control system is configured to close the second switch device to establish a conductive path between the SESS and the alternator for supplying electric current from the SESS to power the alternator to rotate the engine shaft during a cranking operation. The control system is further configured to open the second switch device after the cranking operation to break the conductive path.

Optionally, the primary battery is electrically connected to the control system via the first switch device and the SESS is electrically connected to the control system via the second switch device. The power delivery system includes a user input device that is electromechanically connected to the first switch device and the second switch device. Manual actuation of the user input device closes the second switch device and opens the first switch device for supplying electric current from the SESS to power the control system for a designated amount of time. Optionally, the control system is configured to open the second switch device and close the first switch device after the designated amount of time from the manual actuation of the user input device to electrically connect the primary battery to the control system for the primary battery to power the control system without the SESS powering the control system.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term may include tangible, computer-readable media, including, without limitation, non-transitory computer storage devices, including without limitation, volatile and non-volatile media, and removable and non-removable media such as firmware, physical and virtual storage, CD-ROMs, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A cranking system comprising:
   a secondary energy storage system (SESS) configured to be disposed onboard a vehicle and conductively connected, via switch devices, to a primary battery and a cranking device of the vehicle; and
   a control system configured to control the switch devices to close a conductive path to discharge electric current from the SESS for powering the cranking device to rotate an engine shaft of an engine during a cranking operation, and responsive to the cranking operation successfully starting the engine, the control system is configured to control the switch devices to electrically disconnect the SESS from the primary battery and the cranking device, which blocks discharge of electric current from the SESS.

2. The cranking system of claim 1, wherein the control system is configured to control the switch devices to maintain the SESS in an electrically isolated state except during the cranking operation, during a charging operation of the SESS, and during a control assist mode in which the control system receives power from the SESS in response to actuation of a user input device.

3. The cranking system of claim 1, further comprising the cranking device which is an alternator onboard the vehicle, and the electric current from the SESS is supplied to the alternator during the cranking operation.

4. The cranking system of claim 1, further comprising the cranking device which is an air start motor powered by compressed air to rotate the engine shaft during the cranking operation.

5. The cranking system of claim 1, wherein the primary battery and the SESS are electrically connected in series.

6. The cranking system of claim 1, wherein the control system is configured to control the switch devices to electrically disconnect the primary battery from the SESS and prevent the primary battery from powering the cranking device during the cranking operation.

7. The cranking system of claim 1, wherein the control system is configured to control the switch devices to close a second conductive path for the primary battery to power the cranking device concurrent with the SESS during the cranking operation.

8. The cranking system of claim 1, further comprising a user input device that is electromechanically connected to a first switch device and a second switch device of the switch devices, wherein manual actuation of the user input device controls the first switch device to connect the SESS to the control system for powering the control system and controls the second switch device to disconnect the primary battery from the control system.

9. The cranking system of claim 1, wherein the control system further includes one or more sensors configured to monitor a voltage of the primary battery, and
the control system is configured to control the switch devices to close the conductive path for the SESS to power the cranking device in response to determining, based on sensor signals generated by the one or more sensors, that one or more of the voltage of the primary battery is below a designated threshold or an excessive drop in the voltage of the primary battery occurred during a previous cranking operation.

10. The cranking system of claim 1, wherein the control system is configured to control the switch devices to close the conductive path for the SESS to power the cranking device in response to determining that the SESS has a greater available amount of electrical energy than the primary battery for powering the cranking device.

11. The cranking system of claim 1, wherein the control system is configured to monitor a duration of a charging operation involving discharge of electric current from the primary battery to the SESS along a charge circuit, and the control system is configured to control the switch devices to open the charge circuit and prevent the discharge of the electric current from the primary battery in response to the duration surpassing a designated time limit.

12. The cranking system of claim 1, wherein the control system further includes one or more sensors configured to monitor a voltage of the primary battery, and
in response to the voltage of the primary battery exceeding a designated threshold voltage during a charging operation, the control system is configured to control the switch devices to close a conductive path from the primary battery to the SESS to discharge excess electric current from the primary battery to the SESS.

13. The cranking system of claim 1, wherein, responsive to the cranking operation successfully starting the engine, the control system is configured to control the switch devices to cause the primary battery to discharge electric current along a second conductive path for powering one or more electrical loads of the vehicle while the engine is operating and the SESS is in an electrically isolated state.

14. A method comprising:
controlling, via a control system, one or more switch devices to close a conductive path to discharge electric current from a secondary energy storage system (SESS) to power a cranking device of a vehicle to rotate an engine shaft of an engine during a cranking operation, the SESS configured to be disposed onboard the vehicle and conductively connected via the one or more switch devices to a primary battery and the cranking device; and
responsive to the cranking operation successfully starting the engine, controlling the one or more switch devices to electrically disconnect the SESS from the primary battery and the cranking device, which blocks discharge of electric current from the SESS.

15. The method of claim 14, further comprising controlling at least a first switch device of the one or more switch devices to electrically disconnect the primary battery from the SESS to block the primary battery from powering the cranking device during the cranking operation.

16. The method of claim 14, further comprising controlling at least a second switch device of the one or more switch devices to close a second conductive path to permit the primary battery to power the cranking device concurrent with the SESS during the cranking operation.

17. The method of claim 14, further comprising:
receiving sensor signals generated by one or more sensors that monitor the primary battery; and
wherein the one or more switch devices are controlled to close the conductive path to discharge the electric current from the SESS during the cranking operation in response to determining, via the control system and based on the sensor signals, that one or more of a voltage of the primary battery is below a designated threshold or an excessive drop in the voltage of the primary battery occurred during a previous cranking operation.

18. A power delivery system comprising:
an engine including an engine shaft and configured to be disposed onboard a vehicle;
an alternator mechanically coupled to the engine shaft;
a primary battery conductively connected to the alternator via at least a first switch device;
a secondary energy storage system (SESS) conductively connected to the alternator via at least a second switch device and conductively connected to the primary battery via at least a third switch device; and
a control system configured to close the second switch device to establish a conductive path between the SESS and the alternator for supplying electric current from the SESS to power the alternator to rotate the engine shaft during a cranking operation, and responsive to the cranking operation successfully starting the engine, the control system is configured to open the second switch device and one of: (i) open the third switch device or (ii) maintain the third switch device in an open state to electrically isolate the SESS from the primary battery and the alternator, which blocks discharge of electric current from the SESS.

19. The power delivery system of claim 18, wherein the primary battery is electrically connected to the control system via the first switch device and the SESS is electrically connected to the control system via the second switch device, the power delivery system further comprising a user input device that is electromechanically connected to the first switch device and the second switch device, wherein manual actuation of the user input device closes the second switch device and opens the first switch device for supplying electric current from the SESS to power the control system for a designated amount of time.

20. The power delivery system of claim 19, wherein the control system is configured to open the second switch device and close the first switch device after the designated amount of time from the manual actuation of the user input device to electrically connect the primary battery to the control system for the primary battery to power the control system without the SESS powering the control system.

* * * * *